US010063944B2

(12) United States Patent
Du et al.

(10) Patent No.: US 10,063,944 B2
(45) Date of Patent: Aug. 28, 2018

(54) FEEDER FIBER AND CENTRAL OFFICE REDUNDANCY

(71) Applicant: Google Inc., Mountain View, CA (US)

(72) Inventors: Liang Du, Santa Clara, CA (US); Yut Loy Chan, San Jose, CA (US); Xiangjun Zhao, Fremont, CA (US); Changhong Joy Jiang, Dublin, CA (US); Cedric Fung Lam, San Carlos, CA (US); Daoyi Wang, San Jose, CA (US); Tao Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/385,726

(22) Filed: Dec. 20, 2016

(65) Prior Publication Data

US 2018/0176666 A1 Jun. 21, 2018

(51) Int. Cl.
*H04Q 11/00* (2006.01)
(52) U.S. Cl.
CPC ..... *H04Q 11/0005* (2013.01); *H04Q 11/0067* (2013.01); *H04Q 2011/0035* (2013.01); *H04Q 2011/0081* (2013.01)
(58) Field of Classification Search
CPC combination set(s) only.
See application file for complete search history.

(56) References Cited

U.S. PATENT DOCUMENTS 5,838,476 A 11/1998 Harasawa et al.
6,466,341 B1 * 10/2002 Lumish .............. G02B 6/29367
398/82
2002/0181067 A1 * 12/2002 Romanovsky ........ G02F 1/0551
359/245
2006/0153567 A1 * 7/2006 Kim ........................ H04J 14/02
398/72
2006/0250681 A1 * 11/2006 Park ..................... H04B 10/032
359/337.4

(Continued)

OTHER PUBLICATIONS

International Search Report and Written Opinion for the related International Application No. PCT/US2017/054030 dated Dec. 15, 2017.

*Primary Examiner* — David Payne
*Assistant Examiner* — Omar S Ismail
(74) *Attorney, Agent, or Firm* — Honigman Miller Schwartz and Cohn LLP

(57) ABSTRACT

A remote node includes a first node input, a second node input, and an optical switch. The optical switch includes a first switch input optically coupled to the first node input, a second switch input optically coupled to the second node input, a first switch output switchably coupled to the first switch input or the second switch input, and a second switch output switchably coupled to the first switch input or the second switch input. The remote node includes a photodiode optically coupled to the second switch output, and a capacitor electrically coupled to the photodiode and the optical switch. When the first switch input is switchably coupled to the first switch output, the second switch input is switchably coupled to the second switch output. Light received by the second switch input passes out the second switch output to the photodiode. The photodiode charges the capacitor to a threshold charge.

16 Claims, 14 Drawing Sheets

(56) References Cited

U.S. PATENT DOCUMENTS

| | | | |
|---|---|---|---|
| 2007/0264009 A1* | 11/2007 | Sabat, Jr. | H04B 10/1127 398/5 |
| 2008/0095537 A1* | 4/2008 | Sakamoto | H04B 10/0775 398/83 |
| 2009/0238564 A1* | 9/2009 | Rohde | H04B 10/077 398/45 |
| 2009/0317083 A1* | 12/2009 | Prat Goma | H04J 14/0201 398/68 |
| 2013/0183039 A1* | 7/2013 | Hood | H04J 14/0234 398/72 |
| 2014/0314104 A1* | 10/2014 | Huang | H04J 14/0239 370/542 |

* cited by examiner

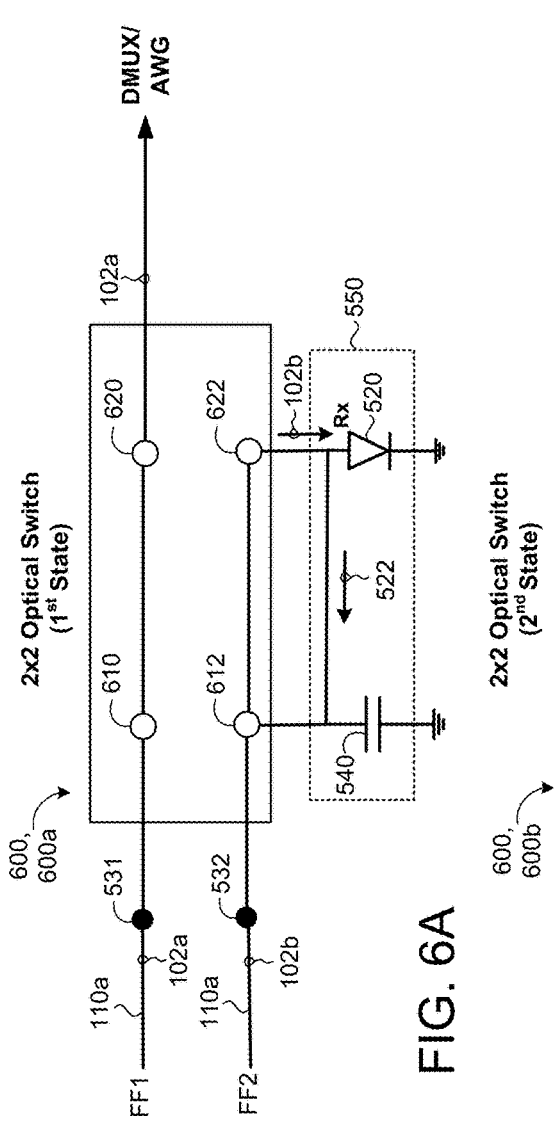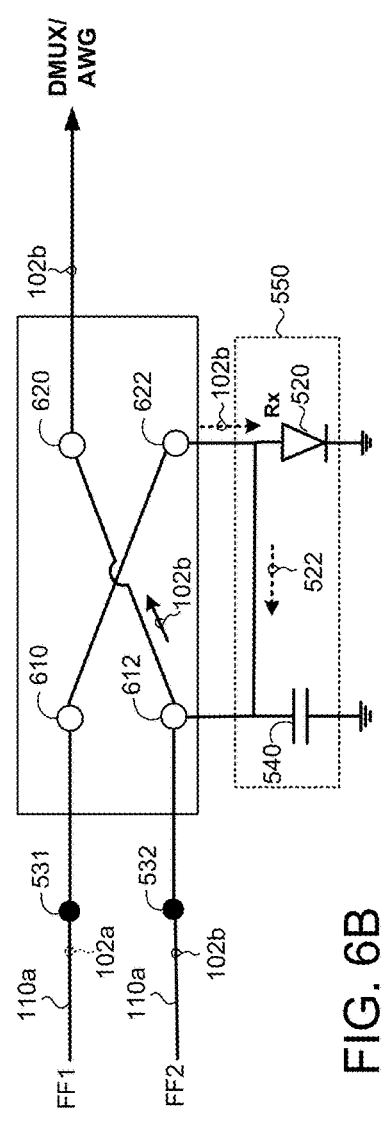
FIG. 6A
FIG. 6B

US 10,063,944 B2

FEEDER FIBER AND CENTRAL OFFICE REDUNDANCY

TECHNICAL FIELD

This disclosure relates to providing feeder fiber and central office redundancy in time-wavelength division multiplexed (TWDM) passive optical networks (PONs).

BACKGROUND

Fiber optic communication is an emerging method of transmitting information from a source (transmitter) to a destination (receiver) using optical fibers as the communication channel. WDM-PON is an optical technology for access and backhaul networks. WDM-PON uses multiple different wavelengths over a physical point-to-multipoint fiber infrastructure that contains passive optical components. The use of different wavelengths allows for traffic separation within the same physical fiber. The result is a network that provides logical point-to-point connections over a physical point-to-multipoint network topology. WDM-PON allows operators to deliver high bandwidth to multiple endpoints over long distances. A PON generally includes an optical line terminal located at a service provider central office (e.g., a hub), a remote node connected to the central office by a feeder fiber, and a number of optical network units or optical network terminals, near end users. The remote node demultiplexes an optical signal from the central office and distributes the demultiplexed optical signals to multiple optical network terminals along corresponding distribution fibers. Time-division-multiplexing (TDM) is a method of transmitting and receiving independent signals over a common signal path by using different, non-overlapping time slots. Time wavelength division multiplexing (TWDM) uses both time and wavelength dimensions to multiplex signals.

The reliability of communications networks is generally very important. Core and metro sections of most networks typically include rings of redundant paths to prevent service outages due to fiber cuts and site outages. The redundant rings serve a large number of customers, allowing the additional costs of implementing redundancy to be shared by a large number of users.

SUMMARY

One aspect of the disclosure provides a remote node including a first node input, a second node input, a two-by-two optical switch, a photodiode and a capacitor. The two-by-two optical switch includes: a first switch input optically coupled to the first node input; a second switch input optically coupled to the second node input; a first switch output switchably coupled to the first switch input or the second switch input; and a second switch output switchably coupled to the first switch input or the second switch input. The photodiode is optically coupled to the second switch output. The capacitor is electrically coupled to the photodiode and the two-by-two optical switch. When the first switch is switchably coupled to the first switch output, the second switch input is switchably coupled to the second switch output, and any light received by the second switch input passes out the second switch output to the photodiode. The photodiode charges the capacitor, and when the capacitor is charged to a threshold charge, the capacitor triggers the two-by-two optical switch to have the first switch input switchably coupled to the second switch output and the second switch input switchably coupled to the first switch output. When the second switch input is switchably coupled to the first switch output, the first switch input is switchably coupled to the second switch output, and any light received by the first switch input passes out the second switch output to the photodiode. The photodiode charges the capacitor, and when the capacitor is charged to the threshold charge, the capacitor triggers the two-by-two optical switch to have the first switch input switchably coupled to the first switch output and the second switch input switchably coupled to the second switch output.

Implementations of the disclosure may include one or more of the following optional features. In some implementations, the optical node includes a demultiplexer optically coupled to the first switch output. The demultiplexer may include an arrayed wavelength grating. The first node input may be optically coupled to a first feeder fiber optically coupled to a first carrier office (CO), and the second node input may be optically coupled to a second feeder fiber optically coupled to a second CO.

Another aspect of the disclosure provides a method of providing feeder fiber redundancy at a remote node. The method includes receiving, at a remote node, a first optical signal from a first feeder fiber optically coupled to a first CO. The remote node includes: a first node input optically coupled to the first feeder fiber; a second node input optically coupled to a second feeder fiber optically coupled to a second CO; a two-by-two optical switch; a photodiode optically coupled to the second switch output; and a capacitor electrically coupled to the photodiode and the two-by-two optical switch. The second optical signal is the same as the first optical signal. The two-by-two switch includes: a first switch input optically coupled to the first node input; a second switch input optically coupled to the second node input; a first switch output switchably coupled to the first switch input or the second switch input; and a second switch output switchably coupled to the first switch input or the second switch input. When the first switch input is switchably coupled to the first switch output, the second switch input is switchably coupled to the second switch output. When the first optical signal is received by the second switch input and passes out the second switch output to the photodiode, the photodiode charges the capacitor. When the capacitor is charged to a threshold charge, the capacitor triggers the two-by-two optical switch to have the first switch input switchably coupled to the second switch output and the second switch input switchably coupled to the first switch output. When the second switch input is switchably coupled to the first switch output, the first switch input is switchably coupled to the second switch output. When the second optical signal is received by the first switch input and passes out the second switch output to the photodiode, the photodiode charges the capacitor. When the capacitor is charged to the threshold charge, the capacitor triggers the two-by-two optical switch to have the first switch input switchably coupled to the first switch output and the second switch input switchably coupled to the second switch output. The method also includes outputting the first optical signal from the first switch output of the remote node, ceasing receipt of the first optical signal at the remote node, and receiving, at the second input node of the remote node, the second optical signal from the second feeder fiber optically coupled to the second CO. The second optical signal may pass out of the second switch output to the photodiode. The method also includes charging, by the photodiode, the capacitor to the threshold charge and switching, by the capacitor, the two-by-two optical switch to have the first switch input switchably coupled to the second switch output and the second switch input switchably coupled to the first switch output, thereby allowing the second optical signal to pass out of the first switch output, the switching causing dissipation of the capacitor.

This aspect may include one or more of the following optional features. In some implementations, the method includes ceasing receipt of the second optical signal at the remote node and receiving again, at the first input node of the remote node, the first optical signal from the first feeder fiber. The first optical signal may pass out of the second switch output to the photodiode. The method may also include charging again, by the photodiode, the capacitor to the threshold charge and switching again, by the capacitor, the two-by-two optical switch to have the first switch input switchably coupled to the first switch output and the second switch input switchably coupled to the second switch output, thereby allowing the first optical signal to pass out of the first switch output.

The method may further include demultiplexing, by a demultiplexer optically coupled to the first switch output, the optical signal outputted from the first switch output into demultiplexed optical signals. The demultiplexer may include an arrayed wavelength grating. The method may also include splitting, by a stage of power splitters optically coupled to the demultiplexer, each demultiplexed optical signal into multiple split-demultiplexed optical signals. The demultiplexer and the state of power splitters may be co-located at the remote node.

Yet another aspect of the disclosure provides an optical network including a first CO configured to transmit a first optical signal, a second CO configured to transmit a second optical signal, a first feeder fiber optically coupled to the first CO, and a second feeder fiber optically coupled to the second CO. The second optical signal is the same as the first optical signal. The optical network also includes a remote node (RN) optically coupled to the first feeder fiber and the second feeder fiber and a controller in communication with the first and second COs. The controller is configured to perform operations including instructing the first CO to transmit the first optical signal to the RN along the first feeder fiber, determining whether the RN receives the first optical signal, and when the RN fails to receive the first optical signal, instructing the second CO to transmit the second optical signal to the RN along the second feeder fiber. The RN includes a first node input optically coupled to the first feeder fiber, a second node input optically coupled to the second feeder fiber, and a two-by-two optical switch. The two-by-two optical switch includes a first switch input optically coupled to the first node input, a second switch input optically coupled to the second node input, a first switch output switchably coupled to the first switch input or the second switch input, and a second switch output switchably coupled to the first switch input or the second switch input. The optical network further includes a photodiode optically coupled to the second switch output and a capacitor electrically coupled to the photodiode and the two-by-two optical switch. When the first switch input is switchably coupled to the first switch output, the second switch input is switchably coupled to the second switch output. When the second optical signal is received by the second switch input and passes out the second switch output to the photodiode, the photodiode charges the capacitor. When capacitor is charged to a threshold charge, the capacitor triggers the two-by-two optical switch to have the first switch input switchably coupled to the second switch output and the second switch input switchably coupled to the first switch output. When the second switch input is switchably coupled to the first switch output, the first switch input is switchably coupled to the second switch output. When the first optical signal is received by the first switch input and passes out the second switch output to the photodiode, the photodiode charges the capacitor. When the capacitor is charged to the threshold charge, the capacitor triggers the two-by-two optical switch to have the first switch input switchably coupled to the first switch output and the second switch input switchably coupled to the second switch output This aspect may include one or more of the following optional features. In some implementations, the RN includes a demultiplexer optically coupled to the first switch output. The demultiplexer may include an arrayed wavelength grating. The RN may also include a stage of power splitters optically coupled to the demultiplexer.

Yet another aspect of the disclosure provides a method of providing feeder fiber redundancy at a remote node. The method includes instructing a first CO to transmit a first optical signal along a first feeder fiber to a remote node RN and determining whether the RN receives the first optical signal. When the RN fails to receive the first optical signal, the method includes instructing a second CO to transmit a second optical signal to the RN along a second feeder fiber. The remote node includes a first node input optically coupled to the first feeder fiber, a second node input optically coupled to the second feeder fiber, and a two-by-two optical switch. The two-by-two optical switch includes a first switch input optically coupled to the first node input, a second switch input optically coupled to the second node input, a first switch output switchably coupled to the first switch input or the second switch input, and a second switch output switchably coupled to the first switch input or the second switch input. The two-by-two optical switch also includes a photodiode optically coupled to the second switch output and a capacitor electrically coupled to the photodiode and the two-by-two optical switch. When the first switch input is switchably coupled to the first switch output, the second switch input is switchably coupled to the second switch output. When the second optical signal is received by the second switch input and passes out the second switch output to the photodiode, the photodiode charges the capacitor. When the capacitor is charged to a threshold charge, the capacitor triggers the two-by-two optical switch to have the first switch input switchably coupled to the second switch output and the second switch input switchably coupled to the first switch output. When the second switch input is switchably coupled to the first switch output, the first switch input is switchably coupled to the second switch output. When the first optical signal is received by the first switch input and passes out the second switch output to the photodiode, the photodiode charges the capacitor. When the capacitor is charged to the threshold charge, the capacitor triggers the two-by-two optical switch to have the first switch input switchably coupled to the first switch output and the second switch input switchably coupled to the second switch output.

This aspect may include one or more of the following optional features. In some implementations, the RN includes a demultiplexer optically coupled to the first switch output. The method may also include demultiplexing, by the demultiplexer optically coupled to the first switch output, the optical signal outputted from the first switch output into demultiplexed optical signals. The method may further include splitting, by a stage of power splitters optically coupled to the demultiplexer, each demultiplexed optical signal into multiple split-demultiplexed optical signals.

In some implementations, the first CO includes a first optical line terminal (OLT) configured to transmit the first optical signal and a first transmit-erbium-doped fiber amplifier (EDFA) optically coupled to the first OLT and the first feeder fiber. The first transmit-EDFA may be operable between a respective enabled state and a respective disabled state. The enabled state of the first transmit-EDFA may be configured to allow the first optical signal transmitted from the first OLT to pass through the first transmit-EDFA to the RN. The disabled state of the first transmit-EDFA may be configured to substantially inhibit the passing of the first optical signal from the first OLT through the first transmit-EDFA to the RN.

The second CO may include a second OLT configured to transmit the second optical signal and a second transmit-EDFA optically coupled to the second OLT and the second feeder fiber. The second transmit-EDFA may be operable between a respective enabled state and a respective disabled state. The enabled state of the second transmit-EDFA may be configured to allow the second optical signal transmitted from the second OLT to pass through the second transmit-EDFA to the RN. The disabled state of the second transmit-EDFA may be configured to substantially inhibit the passing of the second optical signal from the second OLT through the second transmit-EDFA to the RN.

In some examples, the method includes receiving a remote node status indicating whether the RN is receiving the first optical signal from the first CO. When the remote node status indicates that the RN is not receiving the first optical signal from the first CO, the method may include instructing the second transmit-EDFA to be in the enabled state. When the remote node status indicates that the RN is receiving the first optical signal from the first CO, the method may include instructing the second transmit-EDFA to be in the disabled state. The first optical signal and the second optical signal may be the same.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 6A and 6B are schematic views of the two-by-two optical switch of FIG. 5D.

Like reference symbols in the various drawings indicate like elements.

DETAILED DESCRIPTION

Figure 1:
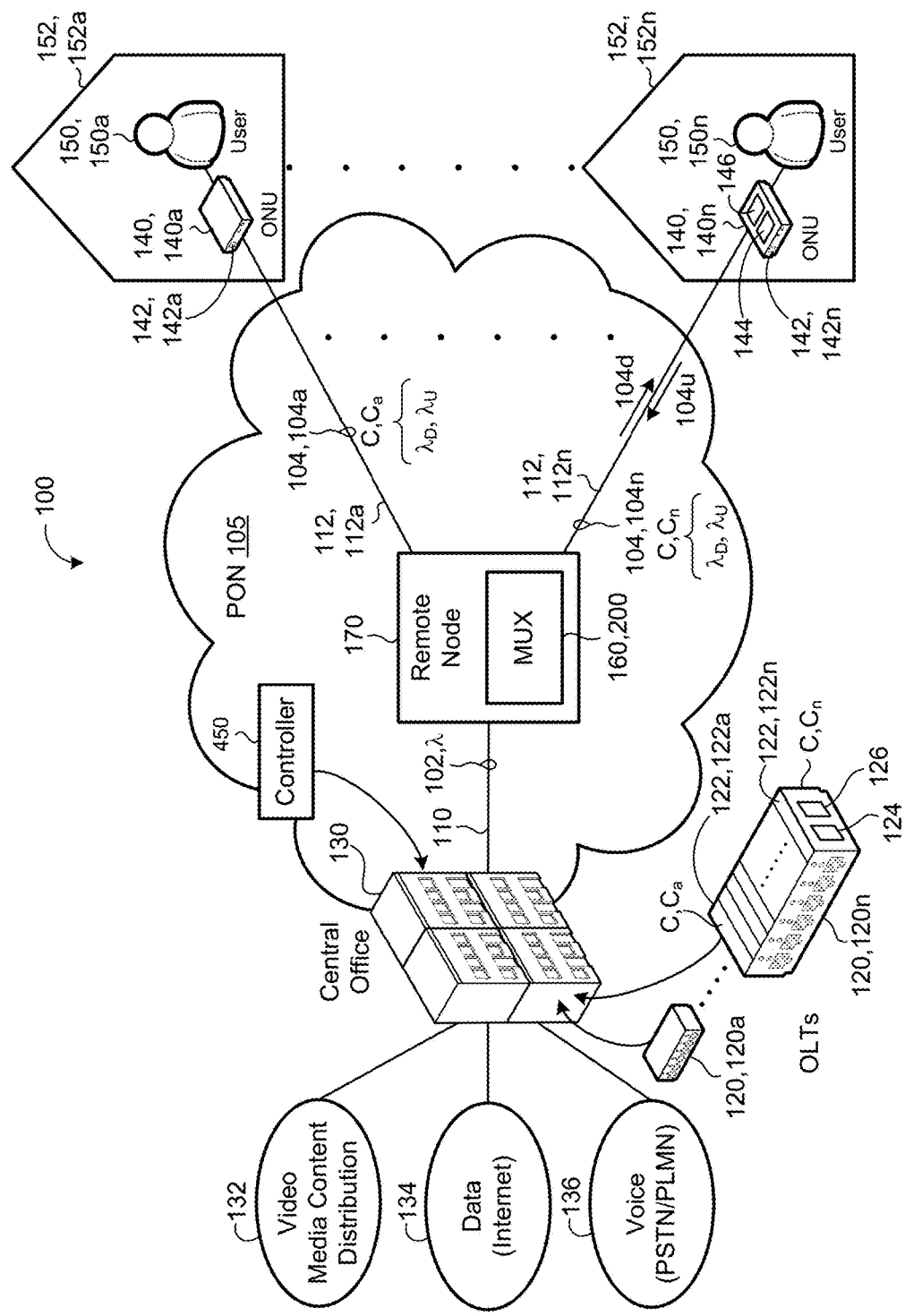
FIG. 1 is a schematic view of an example communication system.

Referring to FIG. 1, a communication system 100 delivers communication signals 102 (e.g., optical signals) through communication links 110, 110a-n, 112, 112a-n (e.g., optical fibers or line-of-sight free space optical communications) between an optical line terminal (OLT) 120 housed in a central office (CO) 130 and optical network units (ONUs) 140, 140a-n (e.g., a bidirectional optical transceiver) associated with users 150, 150a-n (also referred to as customers or subscribers). The ONUs 140, 140a-n are typically located at premises 152, 152a-n of the users 150, 150a-n.

Customer premises equipment (CPE) is any terminal and associated equipment located at the premises 152 of the user 150 and connected to a carrier telecommunication channel C at a demarcation point ("demarc"). In the examples shown, the ONU 140 is a CPE. The demarc is a point established in a house, building, or complex to separate customer equipment from service provider equipment. CPE generally refers to devices such as telephones, routers, switches, residential gateways (RG), set-top boxes, fixed mobile convergence products, home networking adapters, or Internet access gateways that enable the user 150 to access services of a communications service provider and distribute them around the premises 152 of the user 150 via a local area network (LAN).

In some implementations, the optical communication system 100 implements an optical access network 105, such as a passive optical network (PON) 105, for example, for access and mobile fronthaul/backhaul networks. In some examples, the optical communication system 100 implements a point-to-point (pt-2-pt) PON having direct connections, such as optical Ethernets, where a home-run optical link 110, 112 (e.g., fiber) extends all the way back to an OLT 120 at the CO 130 and each customer 150, 150a-n is terminated by a separate OLT 120a-n. In other examples, the optical communication system 100 implements a point-to-multi-point (pt-2-multi-pt) PON, where a shared OLT 120 services multiple customers 150, 150a-n.

The CO 130 includes at least one OLT 120 connecting the optical access network 105 to an Internet Protocol (IP), Asynchronous Transfer Mode (ATM), or Synchronous Optical Networking (SONET) backbone, for example. Therefore, each OLT 120 is an endpoint of the PON 105 and converts between electrical signals used by service provider equipment and optical signals 102 used by the PON 105. Each OLT 120, 120a-n includes at least one transceiver 122, 122a-n, depending on the implementation of the optical access network 105. The OLT 120 sends the optical signal 102 via a corresponding transceiver 122, through a feeder fiber 110 to a remote node (RN) 170, which demultiplexes the optical signal 102 and distributes the demulitplexed optical signals 102 to multiple users 150, 150a-n along corresponding distribution fibers 112, 112a-n. A central controller 450 may monitor the operational state of one or more COs 130, and thereby determine whether a default CO 130 is servicing an RN 170. In some examples, the central controller 450 instructs a CO 130 to offer feeder fiber redundancy to a given RN 170, that by default, is serviced by another CO 130 that has failed or a feeder fiber cut prevents communications between the RN 170 and the default CO 130. The multiplexer 160 for multiplexing/demultiplexing may be an arrayed wavelength grating 200 (AWG), which is a passive optical device. In some examples, each CO 130 includes multiple OLTs 120, 120a-n, and each OLT 120 is configured to service a group of users 150. In addition, each OLT 120 may be configured to provide signals in different services, e.g., one OLT 120 may provide services in 1G-PON, while another OLT 120 provides services in 10G-PON.

As shown in FIG. 1, the CO 130 multiplexes signals received from several sources, such as a video media distribution source 132, an Internet data source 134, and a voice data source 136, and multiplexes the received signals into one multiplexed signal 102 before sending the multiplexed optical signal 102 to the RN 170 through the feeder fiber 110. The multiplexing may be performed by the OLT 120 or a broadband network gateway (BNG) positioned at the CO 130. Typically, services are time-division-multiplexed on the packet layer.

Time-division-multiplexing (TDM) is a method of transmitting and receiving independent signals over a common signal path by using different, non-overlapping time slots. Wavelength division multiplexing (WDM) uses multiple wavelengths $\lambda$, to implement point-to-multi-point communications in the PON 105. The OLT 120 serves multiple wavelengths through one fiber 110 to the multiplexer 160 at the RN 170, which multiplexes/demultiplexes signals between the OLT 120 and a plurality of ONUs 140, 140a-n. Multiplexing combines several input signals and outputs a combined signal. Time wavelength division multiplexing (TWDM) uses both time and wavelength dimensions to multiplex signals.

For WDM, the OLT 120 includes multiple optical transceivers 122, 122a-n. Each optical transceiver 122 transmits signals at one fixed wavelength $\lambda_D$ (referred to as a downstream wavelength) and receives optical signals 102 at one fixed wavelength $\lambda_U$ (referred to as an upstream wavelength). The downstream and upstream wavelengths $\lambda_D$, $\lambda_U$ may be the same or different. Moreover, a channel C may define a pair of downstream and upstream wavelengths $\lambda_D$, $\lambda_U$, and each optical transceiver 122, 122-n of a corresponding OLT 120 may be assigned a unique channel $C_{a-n}$.

The OLT 120 multiplexes/demultiplexes the channels C, $C_{a-n}$ of its optical transceivers 122, 122a-n for communication of an optical signal 102 through the feeder fiber 110. Whereas, the multiplexer 160 at the RN 170 multiplexes/demultiplexes optical signals 102, 104, 104-n between the OLT 120 and a plurality of ONUs 140, 140a-n. For example, for downstream communications, the multiplexer 160 demultiplexes the optical signal 102 from the OLT 120 into ONU optical signals 104, 104-n, i.e., downstream optical signals 104d, for each corresponding ONU 140, 140a-n. For upstream communications, the multiplexer 160 multiplexes ONU optical signals 104, 104-n from each corresponding ONU 140, 140a-n, i.e., upstream optical signals 104u, into the optical signal 102 for delivery to the OLT 120. To make the transmission successful, the optical transceivers 122, 122a-n of the OLT 120 match with the ONUs 140, 140-n one-by-one. In other words, the downstream and upstream wavelengths $\lambda_D$, $\lambda_U$ (i.e., the channel C) of respective downstream and upstream optical signals 104d, 104u to and from a given ONU 140 matches the downstream and upstream wavelengths $\lambda_D$, $\lambda_U$ (i.e., the channel C) of a corresponding optical transceiver 122. In some implementations, each ONU 140, 140a-n includes a corresponding tunable ONU transceiver 142, 142a-n (e.g., that includes a laser or light emitting diode) that can tune to any wavelength $\lambda$ used by a corresponding OLT 120 at a receiving end. The ONU 140 may automatically tune the tunable ONU transceiver 142 to a wavelength $\lambda$ that establishes a communication link between the corresponding OLT 120 and the ONU 140. Each optical transceiver 122, 142 may include data processing hardware 124, 144 (e.g., circuitry, field programmable gate arrays (FPGAs), etc.) and memory hardware 126, 146 in communication with the data processing hardware 124, 144. The memory hardware 126, 146 may store instructions (e.g., via firmware) that when executed on the data processing hardware 124, 144 cause the data processing hardware 124, 144 to perform operations for auto-tuning the optical transceiver 122, 142. The ONU 140 may include a photodetector that converts the optical wave to an electric form. The electrical signal may be further amplified and then de-multiplexed down to subcomponents (e.g., data over a network, sound waves converted into currents using microphones and back to its original physical form using speakers, converting images converted into currents using video cameras and converting back to its physical form using a television). Additional details on auto-tuning the ONU 140 to communicate with the corresponding OLT 120 can be found in U.S. patent application Ser. No. 15/354,811, filed on Nov. 17, 2016, which is hereby incorporated by reference in its entirety.

Figure 2A:
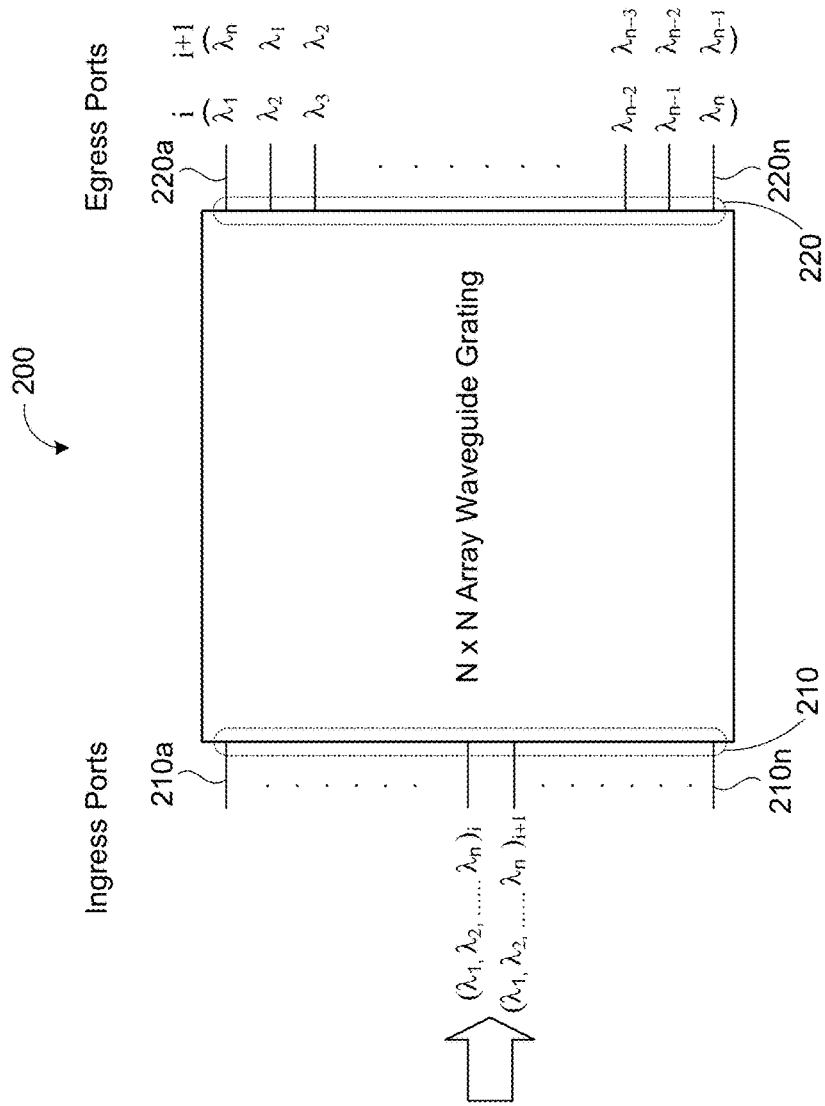
FIGS. 2A and 2B are schematic views of example arrayed waveguide gratings.
Figure 2B:
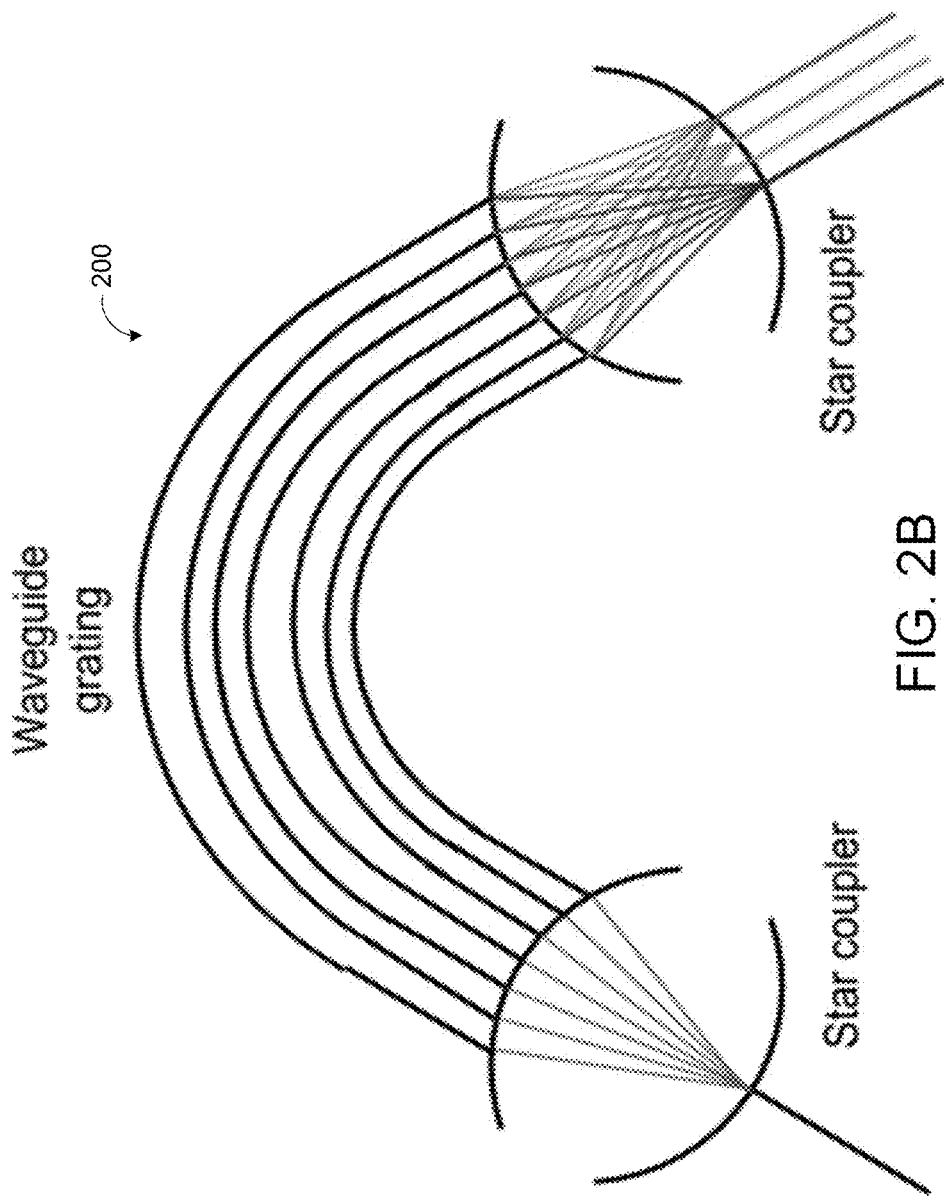

FIGS. 2A and 2B illustrate an exemplary arrayed waveguide grating 200 (AWG), which may be used as a multiplexer 160. An AWG 200 may be used to demultiplex an optical signal in a WDM system or a TWDM system. AWGs 200 can multiplex a large number of wavelengths $\lambda$ into one optical fiber, thus increasing the transmission capacity of optical networks. AWGs 200 can therefore multiplex channels of several wavelengths $\lambda$ onto a single optical fiber at a transmission end, and reciprocally they can also demultiplex different wavelength channels at the receiving end of an optical access network 105. An AWG 200 is a passive planar light wave circuit device typically used as a wavelength multiplexer and/or demultiplexer. N×N AWGs 200 also have wavelength routing capabilities. If a system has N equally-spaced wavelengths $\lambda_n$, an N×N AWG 200 can be designed with an egress port spacing matching the wavelength spacing. The N×N AWG 200 routes differing wavelengths $\lambda$, $\lambda_{1-n}$ at an ingress port 210, 210a-n to different egress ports 220, 220a-n such that all N wavelengths $\lambda_{1-n}$ are mapped to all N egress ports 220a-n sequentially. The routing of the same N wavelengths $\lambda_{1-n}$ at two consecutive ingress ports 210 have the wavelength mapping shifted by one egress side.

The AWG 200 is cyclic in nature. The wavelength multiplexing and demultiplexing property of the AWG 200 repeats over periods of wavelengths called free spectral range (FSR). Multiple wavelengths, separated by the free spectral range (FSR), are passed down each port 220. Therefore, by utilizing multiple FSR cycles, different tiered services may coexist on the same fiber plant.

Figure 3:
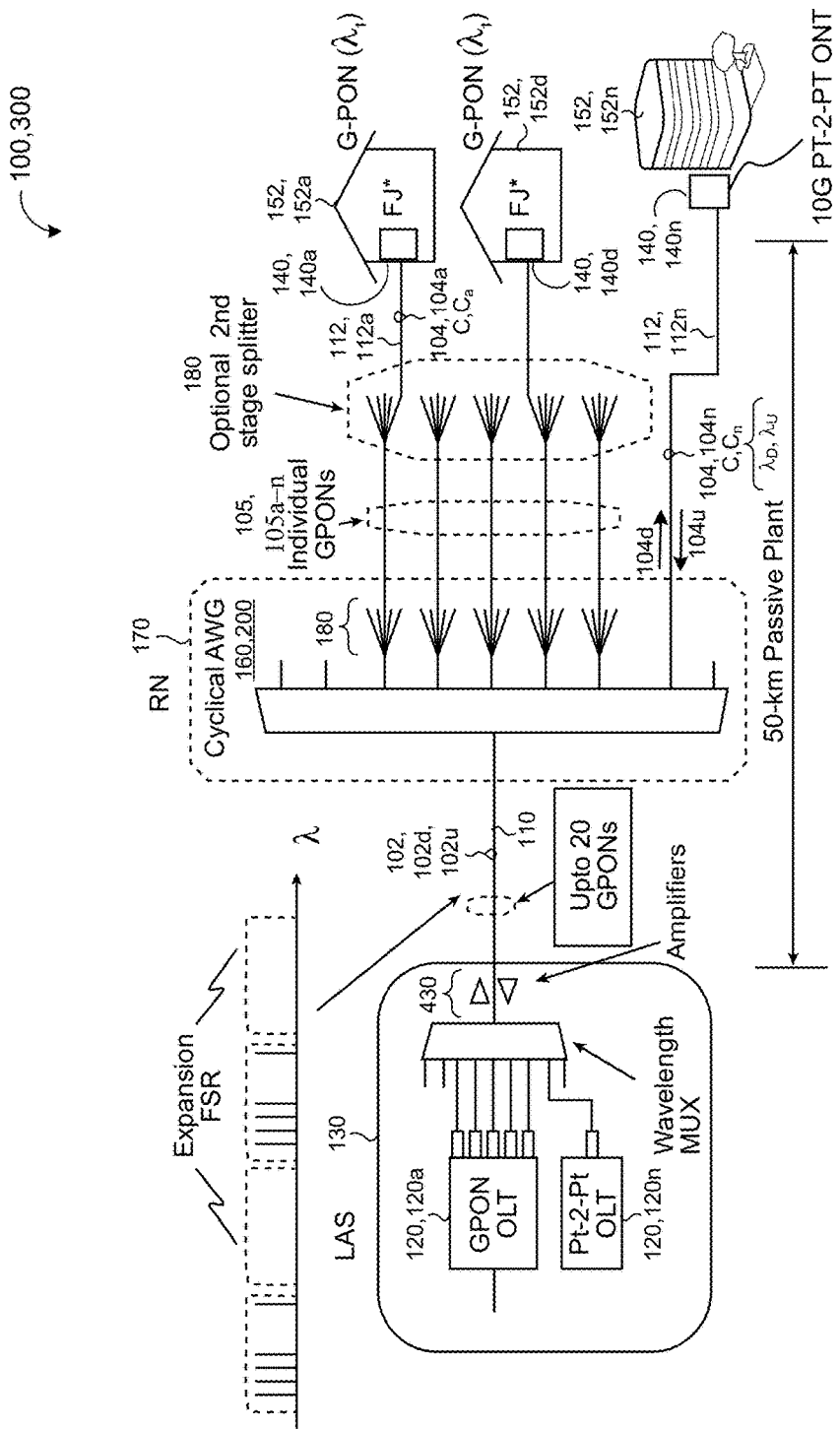
FIG. 3 illustrates an example time-wavelength division multiplexed architecture for a communication system.

FIG. 3 illustrates an example TWDM architecture 300 for the communication system 100 that facilitates user aggregation onto a single strand of fiber 110, 110a-n, 112, 112a-n and PON reach. Multiple PONs 105, 105a-n are stacked using different wavelengths λ via this architecture. The different PONs 105 are combined using wavelength selective multiplexers 160, typically AWGs 200 or thin film filters (TFF). At the RN 170, a cyclical AWG 200 separates the different wavelengths λ, sending each wavelength PON 105 to a different group of users 150. In some examples, the cyclical AWG 200 allow up to 20 different wavelengths λ, thus giving the ability to stack up to 20 PONs 105. Some wavelengths λ may be used for point-to-point services and some wavelengths λ may be used for point-to-multipoint TDM services, as shown. For TDM, one or multiple stages of splitters 180 can be used after the AWG 200 in order to split the optical signals 102 from the feeder fiber 110 out to each single-wavelength optical signal 104, 104a-n of each PON 105 to each corresponding ONU 140, 140a-n. Incorporating splitters 180 after the AWG 200 reduces the number of AWGs 200 required and also allows point-to-point services to bypass the splitters. One of the splitter stages 180 may be co-located with the cyclical AWG 200, but co-location is not required. In order to extend the reach of each PON 105, erbium-doped fiber amplifiers (EDFAs) 430 may amplify both downstream and upstream optical signals 104d, 104u inside the CO 130. EDFAs 430 are typically directional, so the downstream and upstream optical signals 104d, 104u may be amplified separately. Additional details on example TWDM architectures are explained in U.S. patent application Ser. No. 14/952,321, filed on Nov. 25, 2015, which is hereby incorporated by reference in its entirety.

The CO 130 can be the largest single point of failure in the optical communication system 100. To remedy this single point of failure, each RN 170 may be connected to two different COs 130. Although not often realized in deployment, most OLT vendors do have a solution to support this level of redundancy that uses two sets of OLTs 120 in each CO 130. However, having a full set of idle OLTs 120 adds a large upfront cost and increases space and power requirements of the COs 130. Multiple sets of OLTs 120 may be co-located at a single CO 130 as old OLTs are upgraded with improved OLTs. For instance, one or more OLTs 120 may provide services in 1G-PON, while new OLTs 120 may be upgraded at a given CO 130 to provide services in 10G-PON.

Figure 4A:
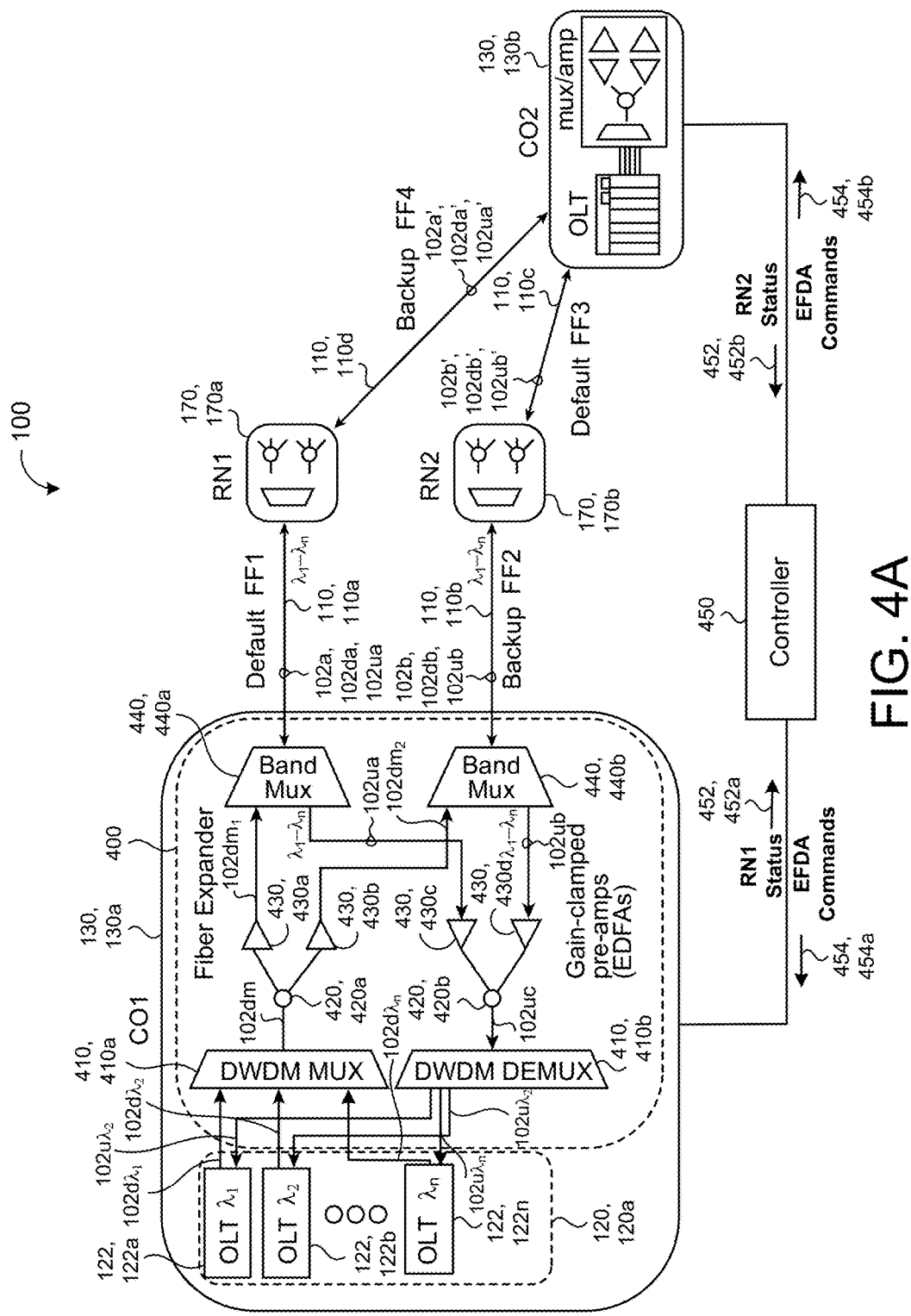
FIGS. 4A-4C are schematic views of a communication system offering feeder fiber redundancy for at least one remote node to alleviate a single central office from being a point of failure for the at least one remote node.
Figure 4B:
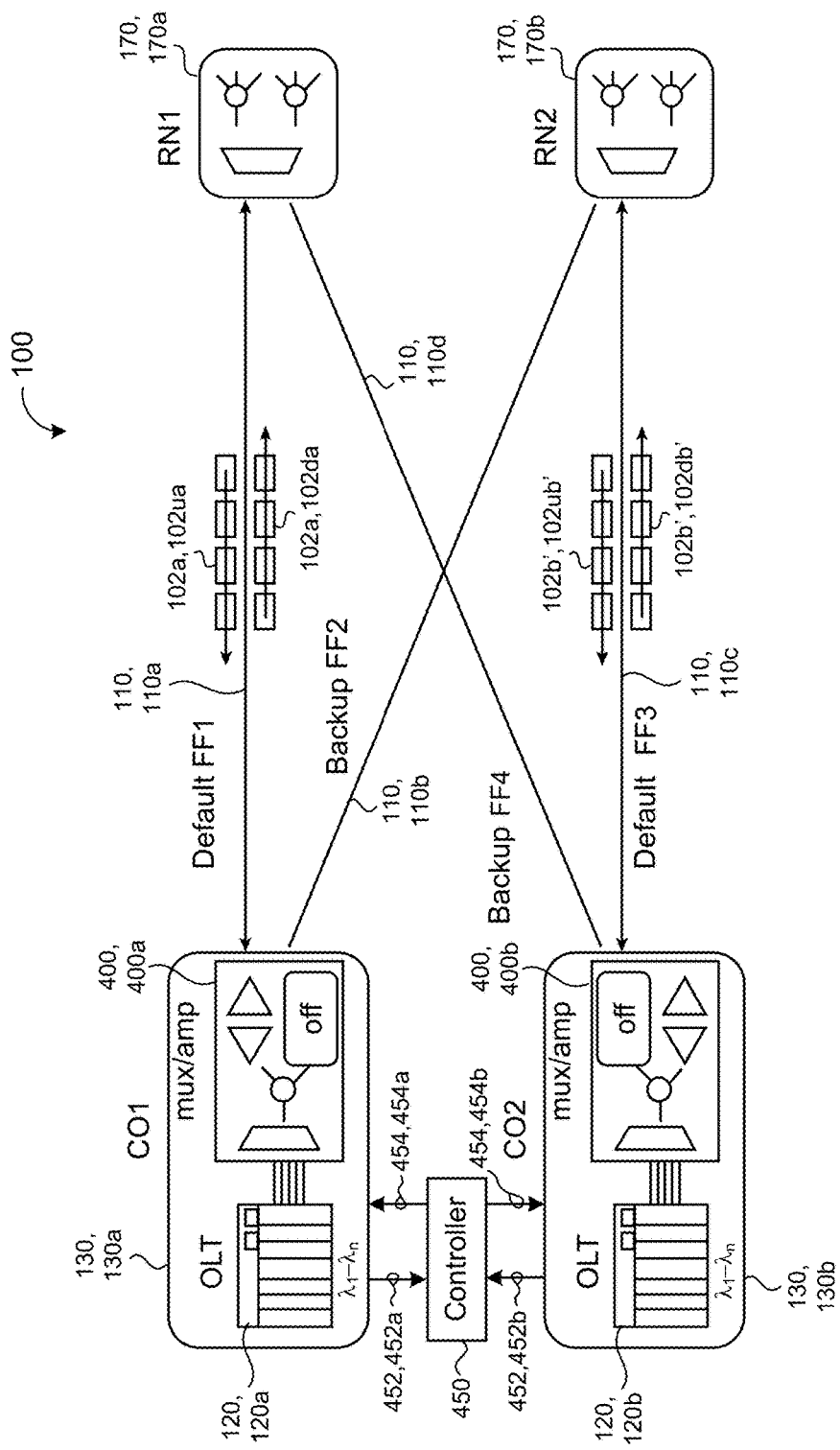
Figure 4C:
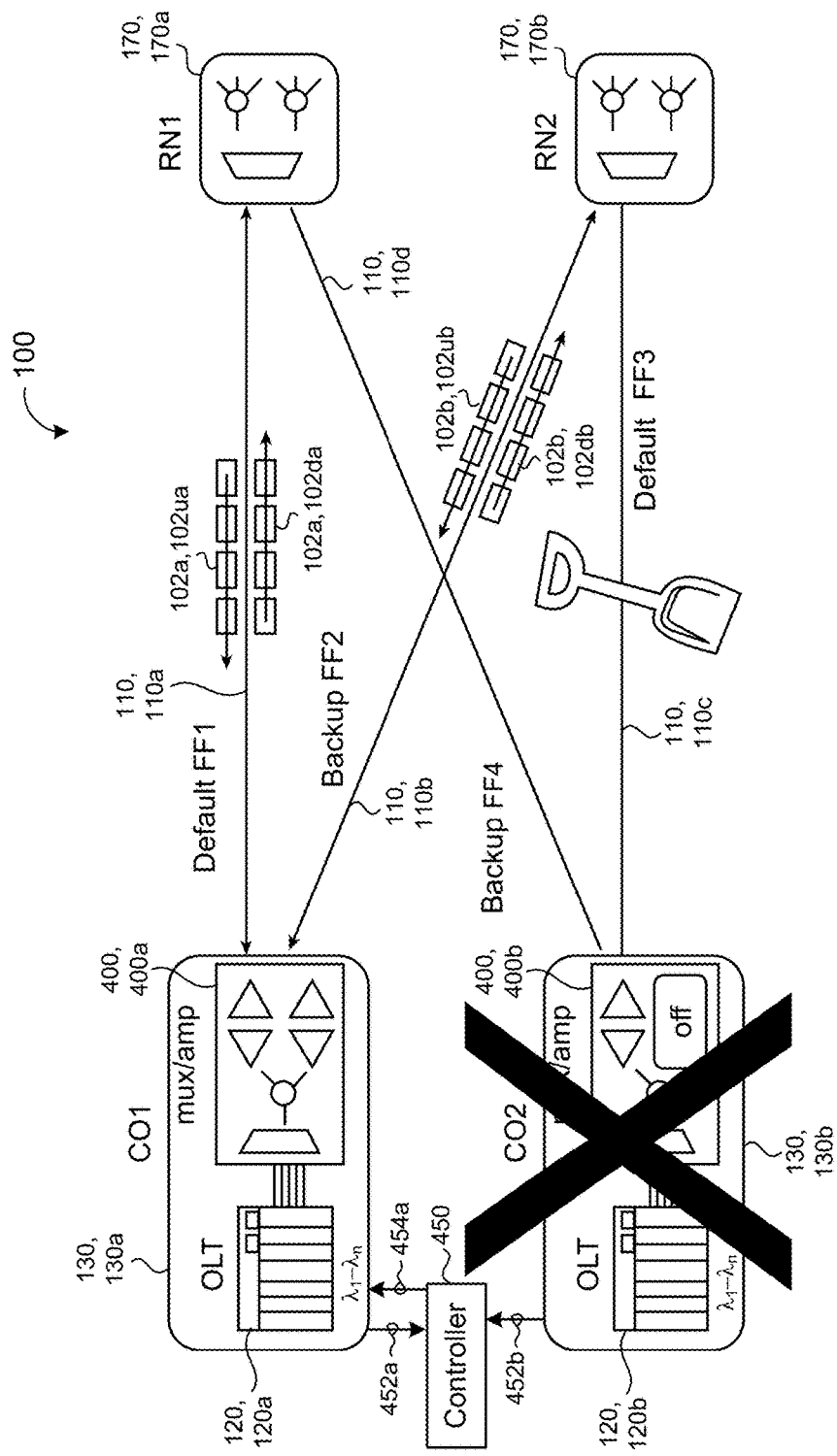

Referring to FIGS. 4A-4C, in some implementations, the communication system 100 offers feeder fiber redundancy for both RNs 170, 170a, 170b to alleviate the possibility of a single CO 130 being a point of failure for both RNs 170. The communication system 100 offers feeder fiber redundancy by having the RN 170 in communication with at least two COs 130, 130a, 130b, so that if a first CO 130a (e.g., CO1) or corresponding first feeder fiber (FF1) 110a fails, a second CO 130b (e.g., CO2) can maintain communications for the RN 170. In the examples shown, at the first CO 130a, a first OLT 120a corresponds to a default OLT 120a for the first RN 170, 170a (RN1) and a backup OLT 120a for the second RN 170, 170b (RN2), while at the second CO 130b, a second OLT 120b corresponds to a default OLT 120b for the second RN 170b (RN2) and a backup OLT 120b for the first RN 170a.

Each CO 130a, 130b includes one or more fiber expanders 400, 400a, 400b to multiplex/demultiplex optical signals 102a, 102b, 102a', 102b' from the OLT ports and provide separate amplification for the optical signals 102a, 102b, 102a', 102b' transmitted/received to and from the at least one RN 170, 170a, 170b. In the examples shown, the fiber expander 400 includes a multiplexer/demultiplexer 410, 410a, 410b optically coupled to the OLT 120, a splitter/combiner 420, 420a, 420b, a pair of transmit-EDFAs 430, 430a, 430b, a pair of receive-EDFAs 430, 430c, 430d, and a pair of band multiplexers 440, 440a, 440b. The multiplexer/demultiplexer 410 is optically coupled to the OLT 120 and may use dense wavelength division multiplexing (DWDM) for multiplexing/demultiplexing optical signals 102. The multiplexer/demultiplexer 410 includes a multiplexer side (DWDM MUX) 410a for multiplexing downstream optical signals $102d\lambda_1$-$\lambda_n$ transmitted from the OLT 120 and includes a demultiplexer side (DWDM DEMUX) 410b for demultiplexing upstream optical signals 102u received by the OLT 120 from the RN 170. The splitter/combiner 420 includes a splitter side 420a for splitting downstream multiplexed signals 102dm into respective first and second split-multiplexed signals $102dm_1$, $102dm_2$. The splitter/combiner 420 also includes a combiner side 420b for combining upstream optical signals 102ua, 102ub amplified by the receive EDFAs 430c, 430d into a combined upstream optical signal 102uc input to the demultiplexer 410b for demultiplexing into upstream optical signals $102u\lambda_1$-$\lambda_n$ received by the OLT 120.

Referring to FIG. 4A, the OLT 120a at the first CO 130a is configured to transmit the downstream optical signal 102, $102d\lambda_1$-$\lambda_n$. In some examples, the OLT 120a includes two or more transceivers 122, 122a-n each configured to transmit a corresponding downstream optical signal 102, $102d\lambda_1$-$\lambda_n$ at a corresponding target wavelength λ, $\lambda_1$-$\lambda_n$. In other examples, the OLT 120a includes a laser array configured to transmit multiple optical signals 102, $102d\lambda_1$-$\lambda_n$.

In some examples, the multiplexer 410a (e.g., DWDM MUX) is configured to multiplex the downlink optical signals 102, $102d\lambda_1$-$\lambda_n$ into the downstream multiplexed signal 102dm received by the splitter 420a. The splitter 420a is configured to split the received multiplexed signal 102dm into the first and second split-multiplexed signals $102dm_1$, $102dm_2$, route the first split-multiplexed signal $102dm_1$ to the first transmit-EDFA 430a, and route the second split-multiplexed signal $102dm_2$ to the second transmit-EDFA 430b. When enabled, each transmit-EDFAs 430a, 430b is configured to amplify the corresponding split-multiplexed signal $102dm_1$, $102dm_2$ received from the splitter 420a.

The first band multiplexer 440a is optically coupled the first transmit-EDFA 430a and a first feeder fiber (FF1) 110a. The first feeder fiber 110a is optically coupled to the first transmit-EDFA 430a and the first RN 170a. In the example shown, the first band multiplexer 440a is configured to multiplex between: i) the first optical signal 102a; and ii) the first split-multiplexed signal $102dm_1$ and a third (upstream) optical signal 102ua. The first band multiplexer 440a receives the first split-multiplexed signal $102dm_1$ from the first transmit-EDFA 430a and passes the first split-multiplexed signal $102dm_1$ as the downstream component 102da of the first optical signal 102a. The first band multiplexer 440a also demultiplexes out the third (upstream) optical signal 102ua from the first optical signal 102a and passes the third (upstream) optical signal 102ua to the first receive-EDFA 430c. In some examples, the first feeder fiber 110a corresponds to a default feeder fiber 110, 110a for the first RN 170a and is configured to route the first optical signal 102a between the first RN 170a and the first CO 130a, which corresponds to the default CO 130a for the first RN 170a. Since the first optical signal 102a carries the one or more wavelengths $\lambda_1$-$\lambda_n$, the one or more wavelengths $\lambda_1$-$\lambda_n$ all pass between the first CO 130a and the first RN 170a.

In other configurations, the first band multiplexer 440a may include a filtering device configured to allow one or more wavelengths $\lambda_1$-$\lambda_n$ of the first split-multiplexed signal 102$dm_1$ to pass through the first feeder fiber 110a to the first RN 170a, while blocking the passage therethrough of one or more other wavelengths $\lambda_1$-$\lambda_n$ of the first split-multiplexed signal 102$dm_1$.

On the other hand, the second band multiplexer 440b is optically coupled to the second transmit-EDFA 430b and a second feeder fiber (FF2) 110b. The second feeder fiber 110b is optically coupled to the second transmit-EDFA 430b and the second RN 170b. In the example shown, the second band multiplexer 440b is configured to multiplex between: i) the second optical signal 102b; and ii) the second split-multiplexed signal 102$dm_2$ and a fourth (upstream) optical signal 102ub. The second band multiplexer 440b receives the second split-multiplexed signal 102$dm_2$ from the second transmit-EDFA 430b and passes the second split-multiplexed signal 102$dm_2$ as the downstream component 102db of the second optical signal 102b. The second band multiplexer 440b also demultiplexes out the fourth (upstream) optical signal 102ub from the second optical signal 102b and passes the fourth (upstream) optical signal 102ub to the second receive-EDFA 430d. In some examples, the second feeder fiber 110b corresponds to a backup feeder fiber 110, 110b for the second RN 170b and is configured to route the second optical signal 102b between the second RN 170b and the first CO 130a, which corresponds to the backup CO 130a for the second RN 170b. Since the second optical signal 102b carries the one or more wavelengths $\lambda_1$-$\lambda_n$, the one or more wavelengths $\lambda_1$-$\lambda_n$ all pass between the first CO 130a and the second RN 170b.

In other configurations, the second band multiplexer 440b may include a filtering device configured to allow one or more wavelengths $\lambda_1$-$\lambda_n$ of the second split-multiplexed signal 102$dm_2$ to pass through the second feeder fiber 110b to the second RN 170b, while blocking the passage therethrough of one or more other wavelengths $\lambda_1$-$\lambda_n$ of the second split-multiplexed signal 102$dm_2$.

In the example shown, the first feeder fiber 110a optically coupling the first CO 130a to the first RN 170a routes the first optical signal 102a (e.g., a multiplexed signal including the upstream and downstream optical signals 102ua, 102da) between the first RN 170a and the first CO 130a, which corresponds to the default CO 130a for the first RN 170a. Likewise, the second feeder fiber 110b optically coupling the first CO 130a to the second RN 170b routes the second optical signal 102b (e.g., a multiplexed signal including the upstream and downstream optical signals 102ub, 102db) between the second RN 170b and the first CO 130a, which corresponds to the backup CO 130a for the second RN 170b. In some examples, the first optical signal 102a and the second optical signal 102b are the same signals, and thus carry the same wavelengths $\lambda_1$-$\lambda_n$ and data.

The second CO 130b includes a substantially identical structure and components as the first CO 130a. In the examples shown, the second CO 130b optically couples to the second RN 170b via a third feeder fiber 110c (e.g., Default FF3) and optically couples to the first RN 170a via a fourth feeder fiber 110d (e.g., Backup FF4). Here, the second CO 130b may correspond to the default CO 130b for the second RN 170b and the backup CO 130b for the first RN 170a. The third feeder fiber 110c optically coupling the second CO 130b to the second RN 170b is configured to route a corresponding second optical signal 102b' (e.g., a multiplexed signal which includes upstream and downstream optical signals 102ub', 102db') between the second RN 170b and the second CO 130b, which corresponds to the default CO 130b for the second RN 170b. Likewise, the fourth feeder fiber 110d optically coupling the second CO 130b to the first RN 170a and is configured to route a corresponding first optical signal 102a' (e.g., a multiplexed signal which includes upstream and downstream optical signals 102ua', 102da') between the first RN 170a and the second CO 130b, which corresponds to the backup CO 130b for the first RN 170a.

In scenarios when the second RN 170b is not receiving communications (e.g., the second optical signal 102b') from the second CO 130b due to a failure at the second CO 130b or the corresponding third feeder fiber 110c, the first CO 130a may backup the second RN 170b by using the second feeder fiber 110b (Backup FF2) to maintain those communications with the second RN 170b. For instance, the first CO 130a may transmit the corresponding second optical signal 102b along the second feeder fiber 110b to the second RN 170b. Similarly, in scenarios when the first RN 170a is not receiving communications (e.g., the first optical signal 102a) from the first CO 130a due to a failure at the first CO 130a or the corresponding first feeder fiber 110a, the second CO 130b may backup the first RN 170a by using the fourth feeder fiber 110d (Backup FF4) to maintain those communications with the first RN 170a. Here, the second CO 130b may transmit the corresponding first optical signal 102a' along the fourth feeder fiber 110d to the first RN 170a.

In some implementations, the EDFAs 430, 430a-d are each operable between an enabled state and a disabled state. The enabled state of each EFDA 430 amplifies and allows light (e.g., optical signals) to pass through the corresponding EFDA 430, while the disabled state of each EFDA 430 substantially inhibits light from passing through the corresponding EFDA 430. Thus, disabling an EFDA 430 causes the EFDA 430 to operate as an attenuator, and therefore, inhibit almost all received light from passing through the EFDA 430.

With continued reference to FIG. 4A, the enabled state of the first transmit-EDFA 430a is configured to allow the first optical signal 102da transmitted from the OLT 120a to pass through the first transmit-EDFA 430a to the first RN 170a. Specifically, the first transmit-EDFA 430a amplifies the first split-multiplexed signal 102$dm_1$ in the enabled state and the amplified first split-multiplexed signal 102$dm_1$, carrying the one or more wavelengths $\lambda_1$-$\lambda_n$, passes through the first band multiplexer 440a to the first RN 170a. On the other hand, the disabled state of the first transmit-EDFA 430a is configured to substantially inhibit the passing of the first optical signal 102da (e.g., the first split-multiplexed signal 102$dm_1$) from the OLT 120a through the first transmit-EDFA 430a to the first RN 170a.

As with the enabled state of the first transmit-EDFA 430a, the enabled state of the second transmit-EDFA 430b is configured to allow the second optical signal 102db transmitted from the OLT 120a to pass through the second transmit-EDFA 430b to the second RN 170b. Specifically, the second transmit-EDFA 430b amplifies the second split-multiplexed signal 102$dm_2$ in the enabled state and the amplified the second split-multiplexed signal 102$dm_2$, carrying the one or more wavelengths $\lambda_1$-$\lambda_n$, passes through the second band multiplexer 440b to the second RN 170b. However, the disabled state of the second transmit-EDFA 430b is configured to substantially inhibit the passing of the second optical signal 102db (e.g., the second split-multiplexed signal 102$dm_2$) from the OLT 120a through the second transmit-EDFA 430b to the second RN 170b.

In some implementations, the central controller 450 receives a first remote node-status 452, 452a (RN1 Status) from the first CO 130a indicating whether the first RN 170a is receiving the first optical signal 102a from the first CO 130a, and receives a second remote node-status 452, 452b (RN2 Status) from the second CO 130b indicating whether the second RN 170b is receiving the second optical signal 102b' from the second CO 130b. The central controller 450 may command the first CO 130a (e.g., the default CO 130a for the first RN 170a) to transmit the first optical signal 102a to the first RN 170a along the first fiber feeder 110a (default FF1) and determine whether the first RN 170a receives the first optical signal 102a from the first CO 130a based on the first remote node-status 452a. When the controller 450 determines that the first remote node 170a fails to receive the first optical signal 102a from the first CO 130a, the controller 450 may command the second CO 130b (e.g., the backup CO 130b for the first RN 170a) to transmit the corresponding first optical signal 102a' to the first RN 170a along the fourth fiber feeder 110d (e.g., backup FF4).

Similarly, the controller 450 may command the second CO 130b (e.g., the default CO 130b for the second RN 170b) to transmit the second optical signal 102b' to the second RN 170b along the third fiber feeder 110c (e.g., default FF3) and determine whether the second RN 170b receives the second optical signal 102b from the second CO 130b based on the second remote node-status 452b. When the controller 450 determines that the second RN 170b fails to receive the second optical signal 102b' from the second CO 130b, the controller 450 may command the first CO 130a (e.g., the backup CO 130a for the second RN 170b) to transmit the corresponding second optical signal 102b to the second RN 170b along the second fiber feeder 110b (e.g., backup FF2).

The central controller 450 may have supervisory control over each CO 130 and may command each CO 130 to transmit first and/or second optical signals 102a, 102b, 102a', 102b' to the associated first and/or second RNs 170a, 170b by commanding at least one of the transmit-EFDAs 430, 430a, 430b to be in the enabled state. For example, when the controller 450 receives the second remote node-status 452, 452b (e.g., from the second CO 130b) indicating that the second RN 170b is not receiving communications (e.g., the second optical signal 102db') from the second CO 130b, the controller 450 may send EDFA commands 454, 454a to the first CO 130a that command the second transmit-EFDA 430b to be in the enabled state. FIGS. 4A and 4C show the enabled state of the second transmit-EFDA 430b at the first CO 130a allowing the second optical signal 102db including the one or more wavelenghts $\lambda_1$-$\lambda_n$ transmitted from the first OLT 120a to pass through the second transmit-EDFA 430b and along the second feeder fiber 110b (e.g., Backup FF2) to the second RN 170b. Here, the first CO 130a is serving as a backup to the second RN 170b to maintain the communications thereto that the second CO 130b is unable to provide due to a failure at the second CO 130b or along the corresponding third feeder fiber 110c serving the second RN 170b. Accordingly, enabling the second transmit-EFDA 430b causes the second transmit-EFDA 430b to amplify the second optical signal 102db (e.g., the second split-demultiplexed signal 102$dm_2$) so that the first CO 130a sends the amplified second optical signal 102b along the second feeder fiber 110b to the second RN 170b.

By contrast, when the second remote node-status 452, 452b indicates that the second RN 170b is receiving communications (e.g., the second optical signal 102b') from second CO 130b, the controller 450 may send EDFA commands 454a to the first CO 130a that command the second transmit-EDFA 430b to be in the disabled state. FIG. 4B shows the disabled state of the second transmit-EDFA 430b (e.g., "OFF") at the first CO 130a substantially inhibiting the passing of the second optical signal 102db including the one or more wavelenghts $\lambda_1$-$\lambda_n$ from the OLT 120a through the second transmit-EDFA 430b to the second RN 170b. Accordingly, since the second RN 170b is successfully communicating with the associated default second CO 130b, disabling the second transmit-EDFA 430b at the first CO 130a prevents the second RN 170b from receiving duplicates of the second optical signal 102b', 102db'. Thus, disabling the second transmit-EFDA 430b ceases the amplification of the second split-multiplexed signal 102$dm_2$ by the second transmit-EDFA 430b, thereby causing the second transmit-EDFA 430b to substantially inhibit the passing of the second optical signal 102db through the second transmit-EDFA 430b to the second RN 170b.

The controller 450 may similarly receive the first remote node-status 452, 452a from the first CO 130a indicating whether the first RN 170a is receiving communications (e.g., the first optical signal 102a) from the first CO 130a. In some examples, when the first remote node-status 452a indicates that the first RN 170a is not receiving the first optical signal 102a from the first CO 130a, the controller 450 sends EDFA commands 454, 454b to the second CO 130b that command the corresponding first transmit-EDFA 430a (not shown) to be in the enabled state. Here, the enabled state of the first transmit-EDFA 430a at the second CO 130b allows the corresponding first optical signal 102a' to transmit from the second CO 130b through the fourth feeder fiber 110d (e.g., Backup FF4) to the first RN 170a. Accordingly, the second CO 130b serves as a backup to the first RN 170a to maintain the communications thereto that the first CO 130a is unable to provide due to a failure at the first CO 130a or along the corresponding first feeder fiber 110a serving the first RN 170a. However, when the first remote node-status 452a indicates that the first RN 170a is receiving the first optical signal 102a from the first CO 130a (as shown in the examples of FIGS. 4A-4C), the controller 450 may send EDFA commands 454b to the second CO 130b that command the corresponding first transmit-EDFA 430a to be in the disabled state (e.g., "OFF" in FIG. 4B), i.e., to prevent the first RN 170a from receiving duplicates of the first optical signal 102a, 102da.

Referring to FIG. 4A, the first receive-EDFA 430c optically couples to the first OLT 120a and the first feeder fiber 110a, while the second receive-EDFA 430d optically couples to the first OLT 120a and the second feeder fiber 110b. The enabled state of the first receive-EDFA 430c is configured to amplify the third (upstream) optical signal 102ua demultiplexed from the first optical signal 102a received from the first RN 170a and pass the amplified third optical signal 102ua to the OLT 120a. By contrast, the disabled state of the first receive-EDFA 430c is configured to substantially inhibit the passing of the third (upstream) optical signal 102ua from the first RN 170a through the first receive-EDFA 430c to the OLT 120a. Here, the first receive-EDFA 430c attenuates the third (upstream) optical signal 102ua that passes through the first band multiplexer 440a. In some examples, the controller 450 commands the first receive-EDFA 430c to be in the same state (i.e., the enabled state or the disabled) as the first transmit-EDFA 430a.

As with the enabled state of the first receive-EDFA 430c, the enabled state of the second receive-EDFA 430d is configured to amplify the fourth (upstream) optical signal 102ub demultiplexed from the second optical signal 102b received from the second RN 170b and pass the amplified fourth (upstream) optical signal 102*ub* to the OLT 120*a*. On the other hand, the disabled state of the second receive-EDFA 430*d* is configured to substantially inhibit the passing of the fourth (upstream) optical signal 102*ub* from the second RN 170*b* through the second receive-EDFA 430*d* to the OLT 120*a*. Thus, disabling the second receive-EDFA 430*d* causes the second receive-EDFA 430*d* to attenuate the fourth (upstream) optical signal 102*ub* that passes through the second band multiplexer 440*b*. In some examples, the controller 450 commands the second receive-EDFA 430*d* to be in the state (e.g., enabled state or the disabled state) as the second transmit-EDFA 430*b*.

The combiner 420*b* receives the amplified third and fourth (upstream) optical signals 102*ua*, 102*ub* from the first and second receive-EDFAs 430*c*, 430*d* and combines the amplified third and fourth (upstream) optical signals 102*ua*, 102*ub* into the upstream combined optical signal 102*uc*. For instance, enabling both of the receive-EDFAs 430*c*, 430*d* allows the combiner 420*b* to combine the third and fourth (upstream) optical signals 102*ua*, 102*ub* into the upstream combined optical signal 102*uc*. As used herein, the upstream combined-optical signal 102*uc* may also be referred to as a combined-multiplexed signal 102*uc*. In scenarios when one of the receive-EDFAs 430*c*, 430*d* is in the disabled state, the combiner 420*b* only receives the one of the third (upstream) optical signal 102*ua* or the fourth (upstream) optical signal 102*ub* amplified by the corresponding one of the receive-EDFAs 430*c*, 430*d* in the enabled state. Thereafter, the demultiplexer 410*b* demultiplexes the combined-multiplexed signal 102*uc* into one or more upstream demultiplexed optical signals 102, 102*u*$\lambda_1$-$\lambda_n$ and passes the one or more upstream demultiplexed optical signals 102, 102*u*$\lambda_1$-$\lambda_n$ to the OLT 120*a*.

As with the first and second transmit-EDFAs 430*a*, 430*b*, the central controller 450 is in communication with the first and second receive-EDFAs 430*c*, 430*d*, and may command each receive EDFA 430*c*, 430*d* to be in one of the enabled state or the disabled state. For instance, when the controller 450 receives the second remote node-status 452*b* indicating that the second RN 170*b* is not receiving optical signals from the second CO 130*b*, the controller 450 may send the EFDA commands 454*a* to the first CO 130*a* that command the second receive-EFDA 430*d* to be in the enabled state. FIGS. 4A and 4C show the enabled state of the second receive-EFDA 430*d* at the first CO 130*a* amplifying the fourth (upstream) optical signal 102*ub* received from the second RN 170*b* along the second feeder fiber 110*b* (e.g., Backup FF2) and passing the amplified fourth (upstream) optical signal 102*ub* to the first OLT 120*a*. Likewise, the enabling (default) of the first receive-EDFA 430*c* enables amplification by the first receive-EDFA 430*c* of the third (upstream) optical signal 102*ua* received from the first RN 170*a* along the first feeder fiber 110*a*, and routes the third (upstream) optical signal 102*ua* to the first OLT 120*a* from the first receive-EDFA 430*c*.

In some implementations, the central controller 450 receives the second remote node-status 452*b* from the second CO 130*b* indicating that the second RN 170*b* is now receiving the second optical signal 102*b*' from the second CO 130*b* when the second CO 130*b* and/or the corresponding third feeder fiber 110*c* is restored and operational after a failure. In response to the second remote node-status 452*b* (i.e., indicating the receiving of optical signal 102*b*' by the second RN 170*b* from the second CO 130*b*), the controller 450 may send the EFDA commands 454*a* to the first CO 130*a* that command the second receive-EDFA 430*d* to be in the disabled state. The disabling the second receive-EDFA 430*d* disables the amplification by the second receive-EDFA 430*d* of the fourth (upstream) optical signal 102*ub* received from the second RN 170*b* along the second feeder fiber 110*b* (e.g., Backup FF2). Accordingly, disabling the amplification by the second receive-EDFA 430*d* causes the second receive-EDFA 430*d* to substantially inhibit receipt of the fourth (upstream) optical signal 102*ub* through the second receive-EDFA 430*d*.

FIG. 4B shows both the first and second COs 130*a*, 130*b* and their corresponding default feeder fibers 110*a*, 110*c* fully operational such that the first CO 130*a* communicates with the first RN 170*a* along the first feeder fiber 110*a* and the second CO 130*b* communicates with the second RN 170*b* along the third feeder fiber 110*c*. For example, the first feeder fiber 110*a* (e.g., Default FF1) routes the first optical signal 102*a* (e.g., a multiplexed signal including the upstream and downstream optical signals 102*ua*, 102*da*) between the first CO 130*a* and the first RN 170*a*. Since the first CO 130*a* is only serving the first RN 170*a*, the one or more wavelengths $\lambda$, $\lambda_1$-$\lambda_n$ carried by the first optical signal 102*a* only include temporal information and data for the first RN 170*a*. Likewise, the third feeder fiber 110*c* (e.g., Default FF3) routes the second optical signal 102*b*' (e.g., a multiplexed signal including the upstream and downstream optical signals (102*ub*', 102*db*') between the second CO 130*b* and the second RN 170*b* along. Since the second CO 130*b* is only serving the second RN 170*b*, the one or more wavelengths $\lambda$, $\lambda_1$-$\lambda_n$ carried by the second optical signal 102*b*' only include temporal information and data for the second RN 170*b*. Thus, the one or more wavelengths $\lambda$, $\lambda_1$-$\lambda_n$ associated with the first optical signal 102*a* contain different temporal information and data than the one or more wavelengths $\lambda$, $\lambda_1$-$\lambda_n$ associated with the second optical signal 102*b*'.

The controller 450 receives the first remote node-status 452*a* indicating that the first RN 170*a* is receiving optical signals (e.g., first optical signal 102*a*) from the first CO 130*a*, and sends the EDFA commands 454*b* to the second CO 130*b* that command both the second transmit-EFDA 430*b* and the second receive-EFDA 430*d* to be in their respective disabled state. Accordingly, the second CO 130*b* is not transmitting/receiving any optical signals to or from the first RN 170*a* along the fourth feeder fiber 110*d* (e.g., Backup FF4). As with the first remote node-status 452*a*, the controller 450 also receives the second remote node-status 452*b* indicating that the second RN 170*b* is receiving optical signals (e.g., second optical signal 102*b*') from the second CO 130*b*, and sends the EFDA commands 454*a* to the first CO 130*a* that command both the second transmit-EFDA 430*b* and the second receive-EFDA 430*d* to be in their respective disabled state. Accordingly, the first CO 130*a* is not transmitting/receiving any optical signals to or from the second RN 170*b* along the second feeder fiber 110*b* (e.g., Backup FF2).

FIG. 4C shows a failure occurring at the second CO 130*b* and/or along the third feeder fiber 110*c*, preventing communication of the second optical signal 102*b*' (e.g., a multiplexed signal including the upstream and downstream optical signals 102*ub*', 102*db*') between the second RN 170*b* and the second CO 130*b*, which corresponds to the default CO 130*b* for the second RN 170*b*. The controller 450 receives the second remote node-status 452*b* now indicating that the second RN 170*b* is not receiving optical signals (e.g., second optical signal 102*b*') from the second CO 130*b*, and sends the EFDA commands 454*a* to the first CO 130*a* that command both the second transmit-EFDA 430*b* and the second receive-EFDA 430*d* to be in their respective enabled state.

Accordingly, the enabled state of the second transmit-EDFA 430b allows the first CO 130a to backup and offer redundancy to the second RN 170b by transmitting the second optical signal 102b to the second RN 170b along the second feeder fiber 110b (e.g., Backup FF2). Likewise, the enabled state of the second receive-EFDA 430d enables the second receive-EFDA 430d to amplify the fourth (upstream) optical signal 102ub demultiplexed from the second optical signal 102b received from the second RN 170b and route the amplified fourth optical signal 102ub to the first OLT 120a.

Since the first CO 130a is now serving both the first RN 170a and the second RN 170b, the one or more wavelengths $\lambda$, $\lambda_1$-$\lambda_n$ carried by the first optical signal 102a includes temporal information and data for both the first RN 170a and the second RN 170b. Likewise, the one or more wavelengths $\lambda$, $\lambda_1$-$\lambda_n$ carried by the second optical signal 102b includes temporal information and data for both the second RN 170b and the first RN 170a. Accordingly, the first optical signal 102a and the second optical signal 102b are the same signals, and thus carry the same wavelengths $\lambda_1$-$\lambda_n$ and data.

In some examples, the second CO 130b fails due to an equipment failure, such as a chassis failure of the OLT 120b, or as a result of a power outage at the second CO 130b. The third feeder fiber 110c may fail when the fiber 110c is cut. For instance, the third feeder fiber 110c may be cut during maintenance and then restored when maintenance is complete.

Figure 5A:
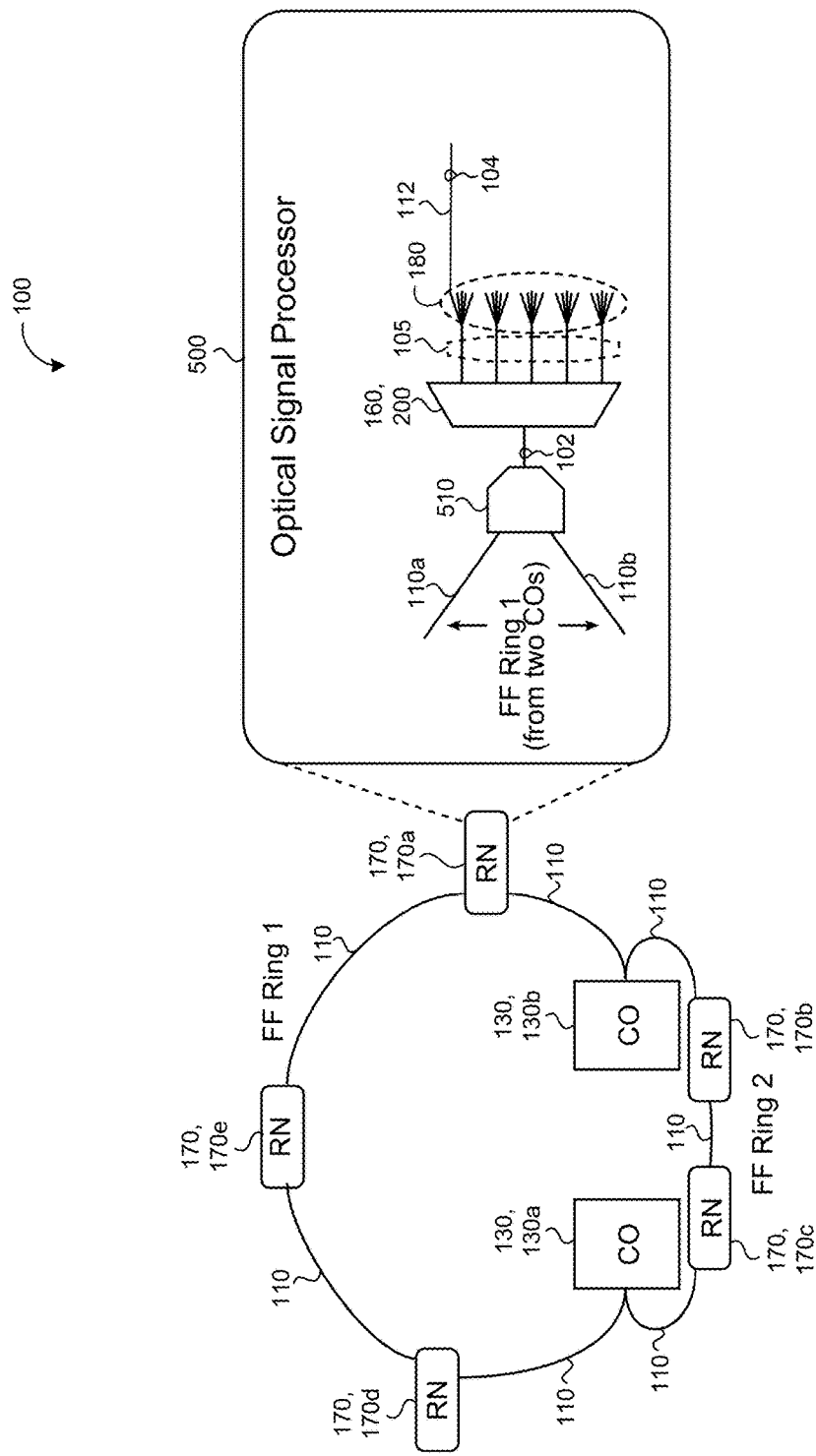
FIG. 5A is a schematic view of an example optical signal processor of a remote node optically coupled to two different central offices.

Referring to FIG. 5A, in some implementations, the communication system 100 includes the first and second COs 130a, 130b offering feeder fiber redundancy for multiple RNs 170, 170a-e to alleviate the possibility of one of the COs 130a, 130b being a point of failure for at least one of the RNs 170. The communication system 100 includes multiple feeder fibers 110 starting at one CO 130a and ending at the other CO 130b to provide first and second feeder fiber rings (e.g., FF Ring 1 and FF Ring 2). The feeder fiber rings enable a single distribution fiber 112 to be fed from both COs 130a, 130b. Each feeder fiber 110 optically couples one of the COs 130 to one of the RNs 170 or optically couples two RNs 170 together. Each feeder fiber 110 may be "U-Shaped" and each RN 170 may include a corresponding optical signal processor 500. Accordingly, the redundant feeder fiber rings serve a large number of customers, allowing the additional costs of implementing redundancy to be shared by a large number of users.

The optical signal processor 500 includes an optical combiner 510, a demultiplexer 160 such as the cyclical AWG 200, and at least one stage of power splitters 180 located after the AWG 200. In the example shown, the optical combiner 510 includes a 2:1 optical combiner (e.g., power splitter) that optically couples to first and second feeder fibers 110a, 110b of the first feeder fiber ring (FF Ring 1). The first feeder fiber 110a is optically coupled to the first CO 130a and the second feeder fiber 110b is optically coupled to the second CO 130b. Accordingly, the optical combiner 510 enables the AWG 200 to be fed by the first and second COs 130a, 130b.

The AWG 200 receives the optical signal 102 output from the optical combiner 510 and performs a wavelength dependent split on the received optical signal 102 to output multiple single-wavelength optical signals 104 of each PON 105. For instance, the cyclical AWG 200 separates the different wavelengths $\lambda$ from the received optical signal 102, and sends each wavelength PON 105 to each corresponding ONU 140, 140a-n (FIG. 3). In some examples, the cyclical AWG 200 allows up to 20 different wavelengths $\lambda$, thus giving the ability to stack up to 20 PONs 105. The power splitters 180 split the single wavelength optical signals 102 of the PONs 105 from the cyclical AWG 200 out to each split single-wavelength optical signal 104, 104a-n of each PON 105 to each corresponding ONU 140. Incorporating splitters 180 after the AWG 200 reduces the number of AWGs 200 required and also allows point-to-point services to bypass the splitters. While the example optical signal processor 500 implements a cyclical AWG 200, the RN 170, 170a may implement other types of demultiplexers.

Figure 5D:
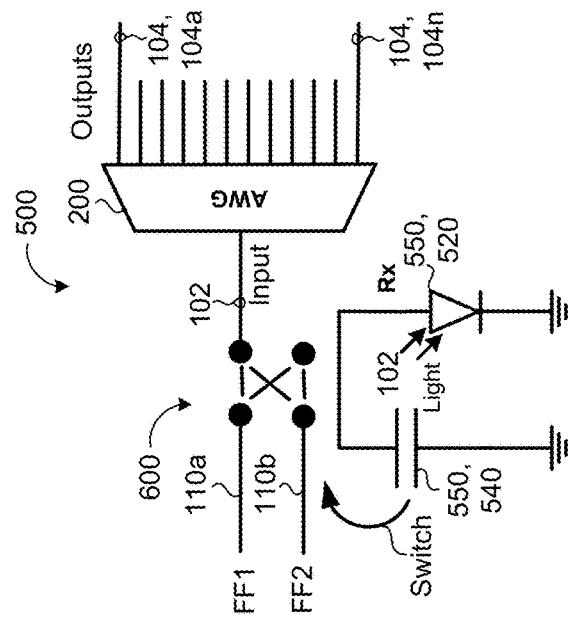
FIG. 5D is a schematic view of an example two-by-two optical switch of a remote node optically coupled to two different central offices.
Figure 5B:
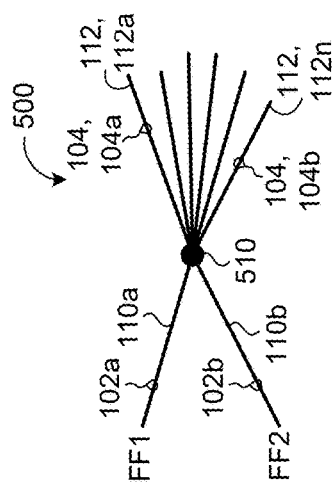
FIG. 5B is a schematic view of an example wavelength division multiplexer of a remote node.

FIG. 5B shows an example optical signal processor 500 at the RN 170, 170a including a 2:N optical splitter 510 configured to receive the optical signals 102 along the first and second feeder fibers 110a, 110b and split the optical signals 102 into multiple optical signals 104, 104a-n. The configuration of FIG. 5B may be utilized in WDM and TWDM communication systems 100 for communicating optical signals between the CO 130 and the ONUs 140 associated with different end users 150, but may need optical filters at each ONU 140.

Figure 5C:
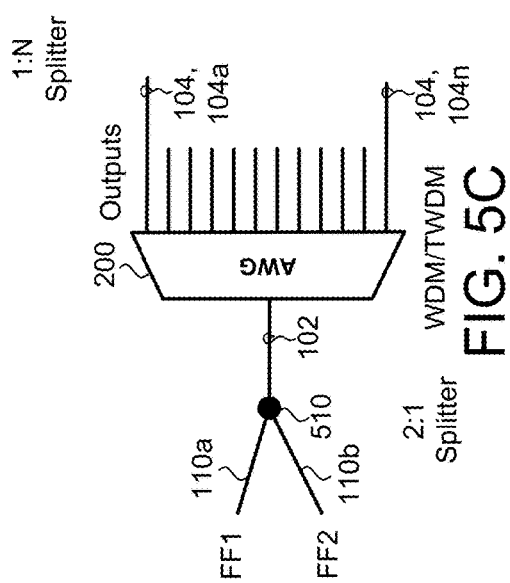
FIG. 5C is a schematic view of an example remote node including an optical combiner combining two optical signals into a combined optical signal.

FIG. 5C shows the optical signal processor 500 including the 2:1 optical combiner 510 (e.g., 2:1 splitter) configured to combine the optical signals along each of the first and second feeder fibers 110a, 110b into a combined optical signal 102 input to the cyclical AWG 200. While the 2:1 optical combiner 510 is capable of combining light (e.g., optical signals 102) from each of the feeder fibers FF1, FF2, the 2:1 optical combiner 510 produces about a three (3) decibel (dB) loss on each port optically coupled to the corresponding feeder fiber FF1, FF2. Greater amplification (e.g., by the transmit-EFDAs 430a, 430b) of the transmitted optical signals 102 is often needed to compensate for the losses produced by the downstream optical coupler 510. However, for RNs 170 implemented over a 50 kilometer (km) passive plant (FIG. 3), increasing the amplification of the optical signals 102 increases costs, consumes more power at the COs 130, and may produce optical signals 102 that are not eye-safe.

Referring to FIG. 5D, in some implementations, the optical signal processor 500 at the RN 170 uses a two-by-two optical switch 600 in place of the 2:1 optical combiner of FIG. 5C to alleviate the large losses (e.g., about 3-dB) associated with 2:1 optical combiners. The two-by-two optical switch 600 is operable to switch between a first state (FIG. 6A) configured to optically couple the first feeder fiber 110a to the multiplexer/demultiplexer 160, such as the AWG 200, and a second state (FIG. 6B) configured to optically couple the second feeder fiber 110b to the AWG 200. Here, when one of the feeder fibers 110a, 110b is optically coupled to the input of the AWG 200, the optical switch 600 optically decouples the other feeder fiber 110a, 110b from the input of the AWG 200. While the optical switch 600 produces losses less than one (1) dB, the optical switch 600 requires power to switch between the first and second states.

In some implementations, the optical switch 600 is optically powered by the downstream optical signal 102 along the feeder fiber 110a, 110b that is currently optically decoupled from the AWG 200 by the optical switch 600. Accordingly, the optical power of the downstream optical signal 102 provides the power source for the optical switch 600 to trigger a change from one of the first state or the second state to the other one of the first state or the second state. Accordingly, optically powering the optical switch 600 allows the RN 170 to avoid having to incorporate additional controllers for switching the state of the optical switch 600. Such controllers would otherwise increase power consumption at the RNs 170 and would be a potential power failure.

An optical switch control circuit (OSCC) 550 includes at least a photodiode 520 optically coupled to the two-by-two optical switch 600 and a capacitor 540 electrically coupled to the photodiode 520 and the two-by-two optical switch 600. The photodiode 520 is configured to receive light (e.g., optical signal 102) passing through the optical switch 600 from one of the feeder fibers 110a, 110b and charge the capacitor 540 to a threshold charge. For instance, the photodiode 520 may receive light from a downstream optical signal 102 along the second feeder fiber 110b while the first feeder fiber 110a is optically coupled to the AWG 200. Here, a failure may have occurred at the first feeder fiber 110a or the corresponding first CO 130a and the second CO 130b is now offering feeder fiber redundancy to the RN 170 by transmitting optical signals along the second feeder fiber 110b. When the capacitor 540 is charged to a threshold charge, the capacitor 540 triggers the two-by-two optical switch 600 to switch to the other state to optically couple the other feeder fiber 110 (e.g., the second feeder fiber 110b) to the AWG 200.

FIGS. 6A and 6B show schematic views 600a, 600b of the two-by-two optical switch 600 of FIG. 5D in the first state (FIG. 6A) and the second state (FIG. 6B). The optical switch 600 includes a first switch input 610 optically coupled to a first node input 531 of the RN 170, and a second switch input 612 optically coupled to a second node input 532 of the RN 170. The first node input 531 is optically coupled to the first feeder fiber 110a optically coupled to the first CO 130a, and the second node input 532 is optically coupled to the second feeder fiber 110b optically coupled to the second CO 130b. Accordingly, the RN 170 is configured to receive a first optical signal 102a from the first CO 130a and a second optical signal 102b from the second CO 130b. In some examples, the first CO 130a is configured to serve the RN 170 as a default and the second CO 130b is configured to serve the RN 170 as a backup in scenarios when a failure occurs at the first CO 130a or the corresponding first feeder fiber 110a. Accordingly, the first and second optical signals 102a, 102b may be the same.

The two-by-two optical switch 600 also includes a first switch output 620 switchably coupled to the first switch input 610 or the second switch input 612, and a second switch output 622 switchably coupled to the first switch input 610 or the second switch input 612. In the example shown, the photodiode 520 of the OSCC 550 is optically coupled to the second switch output 622, and the capacitor 540 of the OSCC 550 is electrically coupled to the photodiode 520 and the optical switch 600.

Referring to FIG. 6A, the first state of the two-by-two optical switch 600 includes the first switch input 610 switchably coupled to the first switch output 620 and the second switch input 612 switchably coupled to the second switch output 622. The coupling of the first switch input 610 to the first switch output 620 optically couples the first node input 531 of the RN 170 to the demultiplexer (DMUX/AWG) 160, 200 to allow the DMUX/AWG 160, 200 to receive the first optical signal 102a from the first CO 130a.

On the other hand, the coupling of the second switch input 612 to the second switch output 622 optically couples the second node input 532 of the RN 170 to the photodiode 520 to allow the photodiode 520 to receive the second optical signal 102b (if any) from the second CO 130b. For instance, any light received by the second switch input 612 (e.g., from the second optical signal 102b) passes out the second switch output 622 to the photodiode 520. The photodiode 520 may use the received light (e.g., the second optical signal 102b) to provide a charge current 522 (e.g., a photocurrent) to charge the capacitor 540. Here, the capacitor 540 is associated with an energy storage device from the charge current 522. In some examples, the capacitor 540 may be a super capacitor (SC). The optical switch 600 remains in the first state until the capacitor 540 is charged to the threshold charge. When the capacitor 540 is charged to the threshold charge, the capacitor 540 triggers the two-by-two optical switch 600 to switch to the second state of FIG. 6B.

FIG. 6B shows the second state of the two-by-two optical switch 600 having the first switch input 610 switchably coupled to the second switch output 622 and the second switch input 612 switchably coupled to the first switch output 620. Now, the coupling between the second switch input 612 and the first switch output 620 optically couples the second node input 532 of the RN 170 to the DMUX/AWG 160, 200 to allow the DMUX/AWG 160, 200 to receive the second optical signal 102b from the second CO 130b.

Conversely, the coupling of the first switch input 610 to the second switch output 622 optically couples the first node input 531 of the RN 170 to the photodiode 520. Here, any light received by the first switch input 610 via the first node input 531 passes out the second switch output 622 to the photodiode 520. In some examples, the first node input 531 is not receiving the first optical signal 102a along the first feeder fiber 110a due to a failure at the first CO 130a or along the first feeder fiber 110a. In these examples, the "dashed arrow" indicates that the first optical signal 102a will pass to the photodiode 520 once the first CO 130a or the corresponding first feeder fiber 110a is restored. When the first switch input 610 receives the first optical signal 102a, the first optical signal 102a will pass out the second switch output 622 to the photodiode 520. The photodiode 520 may use the received light (e.g., the first optical signal 102a) to provide the charge current 522 to charge the capacitor 540. Here, the optical switch 600 remains in the second state until the capacitor 540 is charged to the threshold charge. When the capacitor 540 is charged to the threshold charge, the capacitor 540 is configured to trigger the two-by-two optical switch 600 to switch back to the first state of FIG. 6A. In some examples, the threshold charge includes a value sufficiently high enough to avoid false triggering. Additionally or alternatively, the OSCC 550 may include a timer that enables the switching between states only after light has been collected for some threshold period of time. The capacitor 540 may be associated with a boost or driver circuit configured to supply sufficient voltage or current for switching the state of the two-by-two optical switch 600.

Figure 7:
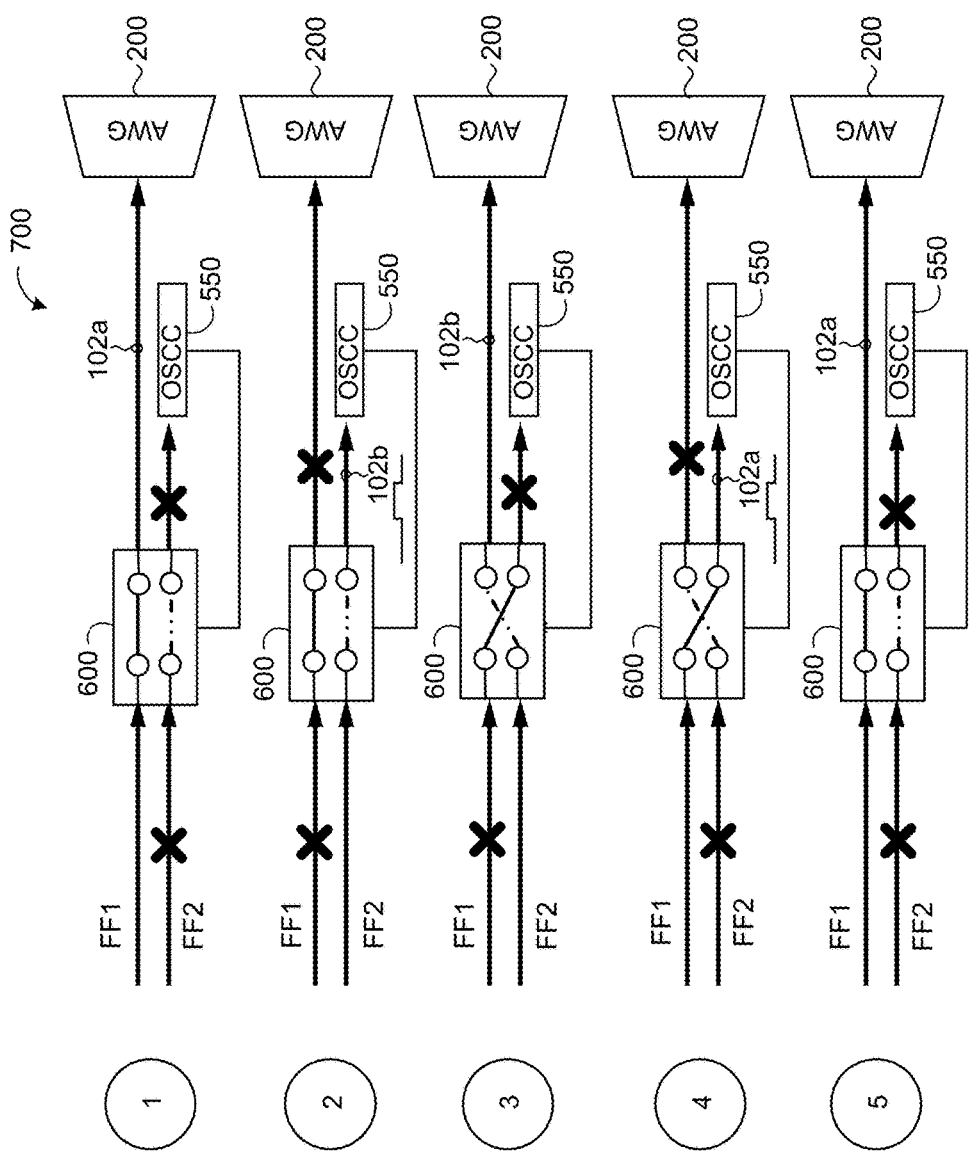
FIG. 7 is a schematic view of operational stages of an example two-by-two optical switch during failure and restoration of a central office or a corresponding feeder fiber optically coupled to the optical switch.

FIG. 7 is a schematic view 700 showing operational stages of the two-by-two optical switch 600 within a RN 170 during failure and restoration of the first CO 130a or corresponding first feeder fiber 110a optically coupled to the RN 170. The OSCC 550 includes the photodiode 520 optically coupled to the second switch output 622 of the optical switch 600, and the capacitor 540 electrically coupled to the photodiode 520 and the optical switch 600. During a first stage ("1"), the first switch input 610 of the optical switch 600 is receiving the first optical signal 102a along the first feeder fiber 110a from the first CO 130a. The optical switch 600 is in the first state (FIG. 6A) including the first switch input 610 switchably coupled to the first switch output 620 to output the first optical signal 102a to the AWG 200 (or other demultiplexer). The "X" denotes that the second switch input 612 is currently not receiving any optical signals 102 (e.g., second optical signal 102b) transmitted by the second CO 130b along the second feeder fiber 110b. Accordingly, no light is passing to the photodiode 520 of the OSCC 550 since the second switch input 612 is not currently receiving any optical signals.

During a second stage ("2"), the RN 170 ceases receipt of the first optical signal 102*a*. Specifically, the "X" denotes that the first switch input 610 of the optical switch 600 ceases receipt of the first optical signal 102*a* from the first CO 130*a* along the first feeder fiber 110*a*. Here, the first feeder fiber 110*a* has become inactive due to a failure at the first CO 130*a* or the corresponding first feeder fiber 110*a*. Possible failure scenarios may include fiber cuts to the first feeder fiber 110*a*, chassis failures of the OLT 120 or other equipment failures at the first CO 130*a*, or loss of power or connectivity by the first CO 130*a*. The controller 450 (FIGS. 4A-4C) may receive the remote node-status 452 from the RN 170 indicating that the RN 170 is no longer receiving optical signals 102 (e.g., the first optical signal 102*a*) from the first CO 130*a*, and instructs the second CO 130*b* to transmit the second optical signal 102*b* to the RN 170 along the second feeder fiber 110*b* (which corresponds to the fourth feeder fiber 110*d* in FIG. 4A). The instructing by the controller 450 may include instructing the controller 450 to send the EFDA instructions 454 to the second CO 130*b* that instruct the corresponding second transmit-EFDA 430*b* (FIG. 4A) to be in the enabled state. The enabled state of the second transmit-EFDA 430 allows the second optical signal transmitted from the second OLT 120*b* of the second CO 130*b* to pass through the second transmit-EFDA 430*b* to the RN 170.

However, before the second optical signal 102*b* (which corresponds the first optical signal 102*a*' from the second CO 130*b* of FIG. 4A) is output to the AWG 200 for demultiplexing, the optical switch 600 needs to switch to the second state by switchably coupling the second switch input 612 to the first switch output 620. Here, the optical switch 600 uses the optical power from the second optical signal 102*b* as the power source for switching from the first state to the second state. For instance, the light associated with the second optical signal 102*b* received by the second switch input 612 passes out to the second switch output 622 to the photodiode 520 and the photodiode 520 provides the charge current 522 to charge the capacitor 540. When the capacitor 540 is charged to the charge threshold, the capacitor 540 triggers the two-by-two optical switch 600 to switch to the second state.

During a third stage ("3"), the capacitor 540 triggers the optical switch 600 to switch to the second state (FIG. 6B) to have the first switch input 610 switchably coupled to the second switch output 622 and the second switch input 612 switchably coupled to the first switch output 620. The switching by the capacitor 540 may cause dissipation of the capacitor 540. Accordingly, the second state of the optical switch 600 allows the second optical signal 102*b* transmitted from the second CO 130*b* along the second feeder fiber 110*b* to pass out of the first switch output 620 and to the AWG 200 for demultiplexing.

During a fourth stage ("4"), the RN 170 ceases receipt of the second optical signal 102*b* from the second CO 130*b*. Specifically, the "X" denotes that the second switch input 612 of the optical switch 600 ceases receipt of the second optical signal 102*b* from the second CO 130*b* along the second feeder fiber 110*b*. In some examples, the central controller 450 instructs the second CO 130*b* to cease transmission of the second optical signal 102*b*, e.g., by commanding the OLT 120 and/or by sending the EFDA instructions 454 that instruct the second transmit-EFDA 430*b* to be in the disabled state. The disabled state of the second transmit-EFDA 430*b* substantially inhibits the passing of the second optical signal 102*b* transmitted from the OLT 120*b* through the second transmit-EFDA 430*b* to the RN 170. In some implementations, the central controller 450 instructs the second CO 130*b* to cease transmission of the second optical signal 102*b* when the controller 450 receives the remote node-status 452 indicating that the RN 170 is again receiving the first optical signal 102*a* from the first CO 130*a*. Thus, the failure at the first CO 130*a* or the corresponding first feeder fiber 110*a* has been restored, thereby enabling the RN 170 to once again receive the first optical signal 102*a* from the first CO 130*a*.

However, before the first optical signal 102*a* is output to the AWG 200 for demultiplexing, the optical switch 600 needs switch back to the first state by switchably coupling the first switch output 620 back to the first switch output 620. Here, the optical switch 600 uses the optical power from the first optical signal 102*a* as the power source for switching from the second state (FIG. 6B) to the first state (FIG. 6A). For instance, the light associated with the first optical signal 102*a* received by the first switch input 610 passes out to the second switch output 622 to the photodiode 520 and the photodiode 520 provides the charge current 522 to charge the capacitor 540. When the capacitor 540 is charged to the charge threshold, the capacitor 540 triggers the two-by-two optical switch 600 to switch to the second state.

During a fifth stage ("5"), the capacitor 540 triggers the optical switch 600 to switch back to the first state (FIG. 6A) having the first switch input 610 switchably coupled to the first switch output 620 and the second switch input 612 switchably coupled to the second switch output 622. The switching by the OSCC 500 may cause dissipation of the capacitor 540. Accordingly, the first state of the optical switch 600 allows the first optical signal 102*a* transmitted from the first CO 130*a* along the first feeder fiber 110*a* to pass out of the first switch output 620 and to the AWG 200 for demultiplexing.

Figure 8:
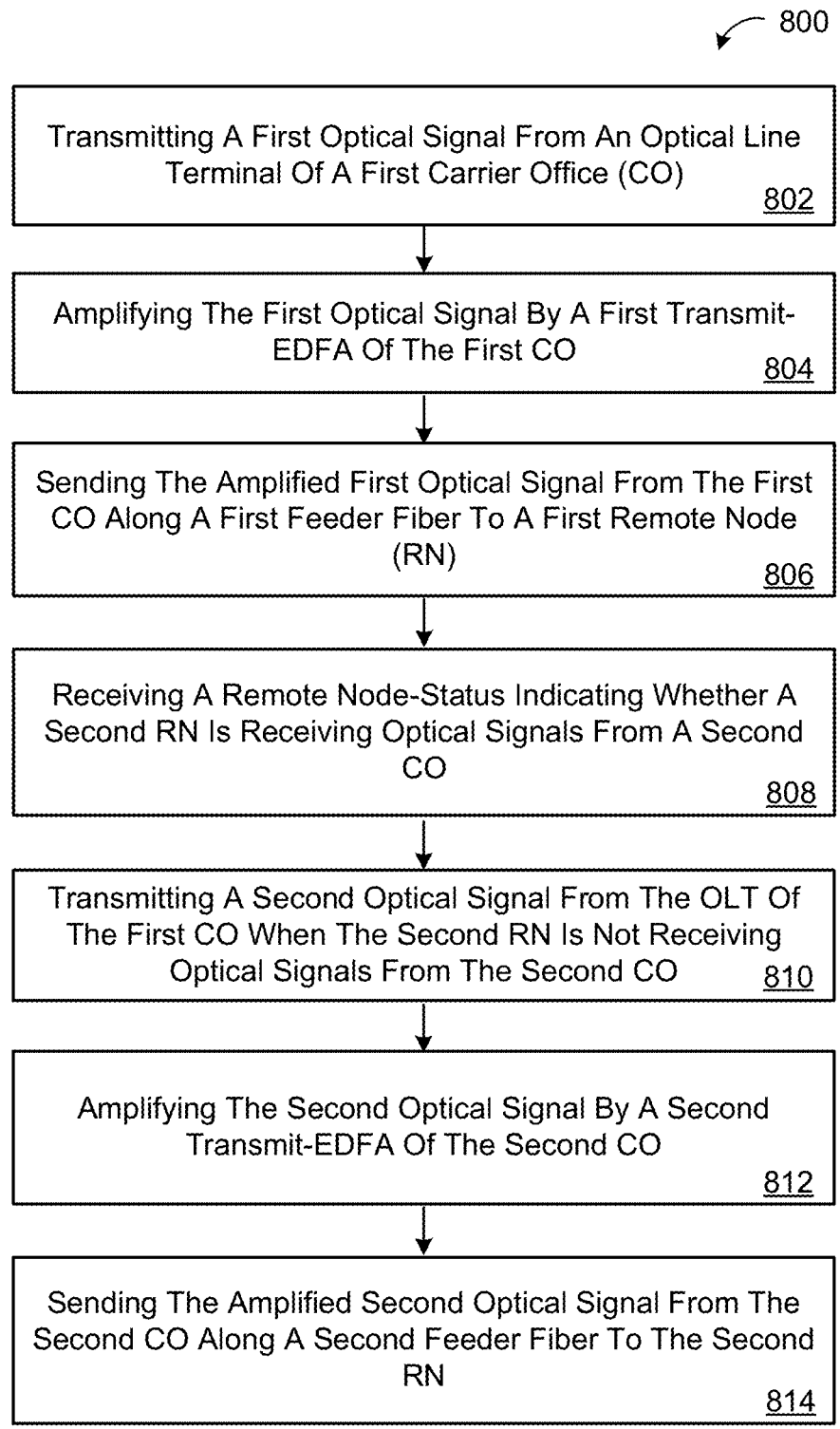
FIG. 8 is a schematic view of an example arrangement of operations for a method of providing central office redundancy by allowing multiple central offices to service a given remote node.

FIG. 8 provides an example arrangement of operations for a method 800 of providing central office (CO) redundancy by allowing multiple COs 130, 130*a*, 130*b* to service a given remote node (RN) 170. At block 802, the method 800 includes transmitting, from an optical line terminal (OLT) 120, 120*a* of a first CO 130, 130*a*, a first optical signal 102*da*. At block 804, the method 800 includes amplifying, by a first transmit-erbium-doped fiber amplifier (EDFA) 430, 430*a* of the first CO 130*a*, the first optical signal 102*da*, and at block 806, sending the amplified first optical signal 102*da* from the first CO 130*a* along a first feeder fiber 110, 110*a* to a first RN 170, 170*a*. At block 808, the method 800 also includes receiving a remote node-status 452 indicating whether a second RN 170, 170*b* is receiving optical signals from a second CO 130, 130*b*. For instance, a central controller 450 in communication with the first and second COs may receive the remote node-status 452 from the second CO 130*b*.

When the remote-node-status 452 indicates that the second RN 170*b* is not receiving optical signals 102*da* from the second CO 130*b*, the method 800 includes, at block 810, transmitting a second optical signal 102*db* from the OLT of the first CO 130*a*. At block 812, the method 800 also includes amplifying the second optical signal 102*db* by a second transmit-EDFA 430, 430*b* of the second CO 130*b*. Here, the central controller 450 may send EFDA instructions 454 to the second transmit-EDFA 430*b* that instruct the second transmit-EDFA 430*b* to be in the enabled state. At block 814, the method 800 includes sending the amplified second optical signal 102*db* from the second CO 130*b* along a second feeder fiber 110, 110*b* to the second RN 170*b*.

Figure 9:
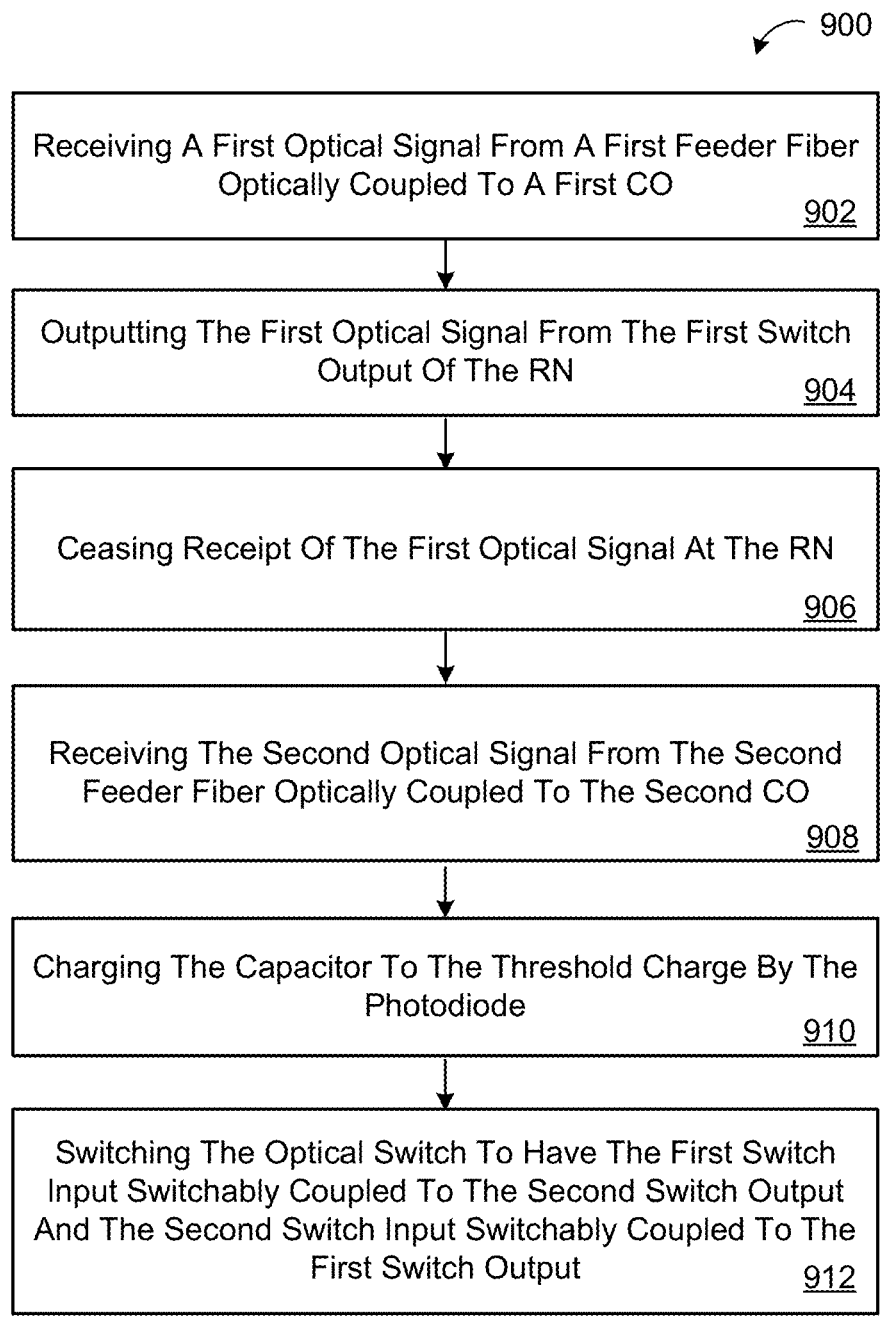
FIG. 9 is a schematic view of an example arrangement of operations for a method of switching a two-by-two optical switch at a remote node.

FIG. 9 provides an example arrangement of operations for a method 900 of switching a two-by-two optical switch 600 at a remote node (RN) 170 when a backup central office (CO) 130 provides redundancy by servicing the RN 170. At block 902, the method 900 includes receiving, at a remote node (RN) 170, a first optical signal 102a from a first feeder fiber 110, 110a optically coupled to a first CO 130, 130a. The RN 170 includes a first node input 531 optically coupled to the first feeder fiber 110a, a second node input 532 optically coupled to a second feeder fiber 110, 110b optically coupled to a second CO 130, 130b. The second CO 130b is configured to transmit a second optical signal 102b. The first and second optical signals 102a, 102b may be the same. The two-by-two optical switch 600 includes a first switch input 610 optically coupled to the first node input 531, a second switch input 612 optically coupled to the second node input 532, a first switch output 620 switchably coupled to the first switch input 610 or the second switch input 612, and a second switch output 622 switchably coupled to the first switch input 610 or the second switch input 612. The RN 170 also includes a photodiode 520 optically coupled to the second switch output 622 and a capacitor 540 electrically coupled to the photodiode 520 and the two-by-two optical switch 600.

At block 904, the method 900 includes outputting the first optical signal 102a from the first switch output 620 of the RN 170. Here, the first optical signal 102a serves as an input demultiplexed by the AWG 200 into multiple demultiplexed-optical signals 104, 104a-n. At block 906, the method 900 also includes ceasing receipt of the first optical signal 102a at the RN 170. For instance, the RN 170 may cease receipt of the first optical signal 102a when the first CO 130a or corresponding first feeder fiber 110a fails. At block 908, the method 900 includes receiving, at the second node input 532 of the RN 170, the second optical signal from the second feeder fiber 110b optically coupled to the second CO 130b. Here, the second optical signal 102b is passing out of the second switch output 622 to the photodiode 520.

At block 910, the method 900 also includes charging, by the photodiode 520, the capacitor 540 to the threshold charge. At block 912, the method 900 includes switching, by the capacitor 540, the two-by-two optical switch 600 to have the first switch input 610 switchably coupled to the second switch output 622 and the second switch input 612 switchably coupled to the first switch output 620. Here, the two-by-two optical switch is in the second state of FIG. 6B, thereby allowing the second optical signal 102b to pass out of the first switch output 620 for demultiplexing by the AWG 200. The switching by the capacitor 540 causes dissipation of the capacitor 540.

Figure 10:
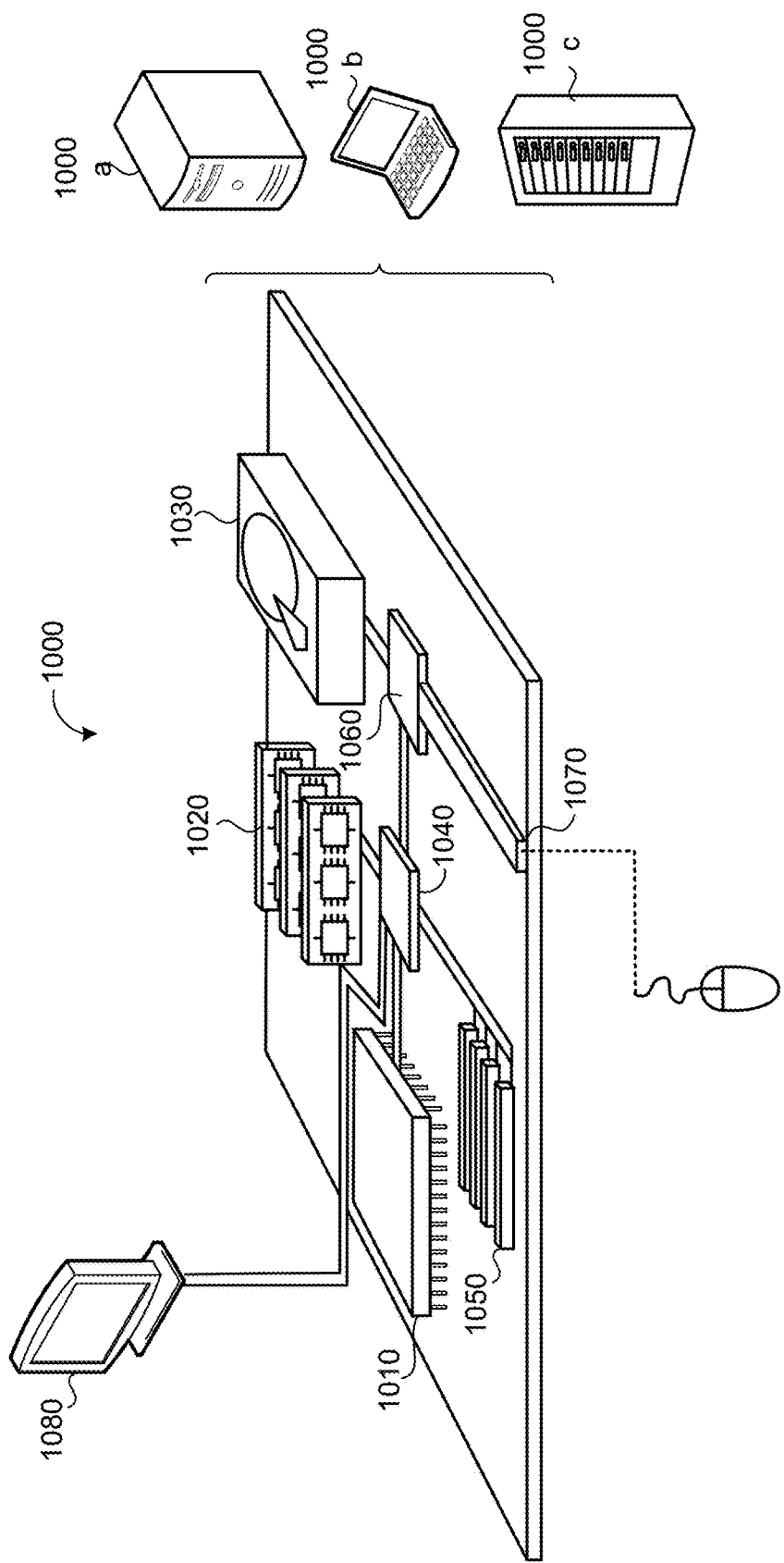
FIG. 10 is schematic view of an example computing device that may be used to implement the systems and methods described in this document.

FIG. 10 is a schematic view of an example computing device 1000 that may be used to implement the systems and methods described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010, memory 1020, a storage device 1030, a high-speed interface/controller 1040 connecting to the memory 1020 and high-speed expansion ports 1050, and a low speed interface/controller 1060 connecting to low speed bus 1070 and storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and low-speed expansion port 1070. The low-speed expansion port 1070, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1000*a* or multiple times in a group of such servers 1000*a*, as a laptop computer 1000*b*, or as part of a rack server system 1000*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:
1. A method comprising:
receiving, at a remote node, a first optical signal from a first feeder fiber optically coupled to a first carrier office (CO), the remote node comprising:
a first node input optically coupled to the first feeder fiber;
a second node input optically coupled to a second feeder fiber optically coupled to a second CO, the second CO configured to transmit a second optical signal, the second optical signal the same as the first optical signal;
a two-by-two optical switch comprising:
a first switch input optically coupled to the first node input;
a second switch input optically coupled to the second node input;
a first switch output switchably coupled to the first switch input or the second switch input; and
a second switch output switchably coupled to the first switch input or the second switch input;
a photodiode optically coupled to the second switch output; and
a capacitor electrically coupled to the photodiode and the two-by-two optical switch,
wherein when the first switch input is switchably coupled to the first switch output, the second switch input is switchably coupled to the second switch output, and when the first optical signal is received by the second switch input and passes out the second switch output to the photodiode, the photodiode charges the capacitor, and when the capacitor is charged to a threshold charge, the capacitor triggers the two-by-two optical switch to have the first switch input switchably coupled to the second switch output and the second switch input switchably coupled to the first switch output, and
wherein when the second switch input is switchably coupled to the first switch output, the first switch input is switchably coupled to the second switch output, and when the second optical signal is received by the first switch input and passes out the second switch output to the photodiode, the photodiode charges the capacitor, and when the capacitor is charged to the threshold charge, the capacitor triggers the two-by-two optical switch to have the first switch input switchably coupled to the first switch output and the second switch input switchably coupled to the second switch output;
outputting the first optical signal from the first switch output of the remote node;
ceasing receipt of the first optical signal at the remote node;
receiving, at the second input node of the remote node, the second optical signal from the second feeder fiber optically coupled to the second CO, the second optical signal passing out of the second switch output to the photodiode;
charging, by the photodiode, the capacitor to the threshold charge;
switching, by the capacitor, the two-by-two optical switch to have the first switch input switchably coupled to the second switch output and the second switch input switchably coupled to the first switch output, thereby allowing the second optical signal to pass out of the first switch output, the switching causing dissipation of the capacitor;
ceasing receipt of the second optical signal at the remote node;
receiving again, at the first input node of the remote node, the first optical signal from the first feeder fiber, the first optical signal passing out of the second switch output to the photodiode;
charging again, by the photodiode, the capacitor to the threshold charge; and
switching again, by the capacitor, the two-by-two optical switch to have the first switch input switchably coupled to the first switch output and the second switch input switchably coupled to the second switch output, thereby allowing the first optical signal to pass out of the first switch output.

2. The method of claim 1, further comprising demultiplexing, by a demultiplexer optically coupled to the first switch output, the optical signal outputted from the first switch output into demultiplexed optical signals.

3. The method of claim 2, wherein the demultiplexer comprises an arrayed wavelength grating.

4. The method of claim 2, further comprising splitting, by a stage of power splitters optically coupled to the demultiplexer, each demultiplexed optical signal into multiple split-demultiplexed optical signals.

5. The method of claim 4, wherein the demultiplexer and the stage of power splitters are co-located at the remote node.

6. An optical network comprising:
a first carrier office (CO) configured to transmit a first optical signal, wherein the first CO comprises:
a first optical line terminal (OLT) configured to transmit the first optical signal; and
a first transmit-erbium-doped fiber amplifier (EDFA) optically coupled to the first OLT and the first feeder fiber, the first transmit-EDFA operable between a respective enabled state and a respective disabled state, the enabled state of the first transmit-EDFA configured to allow the first optical signal transmitted from the first OLT to pass through the first transmit-EDFA to the RN, the disabled state of the first transmit-EDFA configured to substantially inhibit the passing of the first optical signal from the first OLT through the first transmit-EDFA to the RN;
a second CO configured to transmit a second optical signal, the second optical signal the same as the first optical signal, wherein the second CO comprises:
a second OLT configured to transmit the second optical signal; and
a second transmit-EDFA optically coupled to the second OLT and the second feeder fiber, the second transmit-EDFA operable between a respective enabled state and a respective disabled state, the enabled state of the second transmit-EDFA configured to allow the second optical signal transmitted from the second OLT to pass through the second transmit-EDFA to the RN, the disabled state of the second transmit-EDFA configured to substantially inhibit the passing of the second optical signal from the second OLT through the second transmit-EDFA to the RN;
a first feeder fiber optically coupled to the first CO;
a second feeder fiber optically coupled to the second CO;
a remote node (RN) optically coupled to the first feeder fiber and the second feeder fiber; and
a controller in communication with the first and second COs, the controller configured to perform operations comprising:
instructing the first CO to transmit the first optical signal to the RN along the first feeder fiber;
determining whether the RN receives the first optical signal; and
when the RN fails to receive the first optical signal, instructing the second CO to transmit the second optical signal to the RN along the second feeder fiber,
wherein the RN comprises:
a first node input optically coupled to the first feeder fiber;
a second node input optically coupled to the second feeder fiber;
a two-by-two optical switch comprising:
a first switch input optically coupled to the first node input;
a second switch input optically coupled to the second node input;
a first switch output switchably coupled to the first switch input or the second switch input; and
a second switch output switchably coupled to the first switch input or the second switch input;
a photodiode optically coupled to the second switch output; and
a capacitor electrically coupled to the photodiode and the two-by-two optical switch,
wherein when the first switch input is switchably coupled to the first switch output, the second switch input is switchably coupled to the second switch output, and when the second optical signal is received by the second switch input and passes out the second switch output to the photodiode, the photodiode charges the capacitor, and when the capacitor is charged to a threshold charge, the capacitor triggers the two-by-two optical switch to have the first switch input switchably coupled to the second switch output and the second switch input switchably coupled to the first switch output, and
wherein when the second switch input is switchably coupled to the first switch output, the first switch input is switchably coupled to the second switch output, and when the first optical signal is received by the first switch input and passes out the second switch output to the photodiode, the photodiode charges the capacitor, and when the capacitor is charged to the threshold charge, the capacitor triggers the two-by-two optical switch to have the first switch input switchably coupled to the first switch output and the second switch input switchably coupled to the second switch output.

7. The optical network of claim 6, wherein the RN further comprises a demultiplexer optically coupled to the first switch output.

8. The optical network of claim 6, wherein the demultiplexer comprises an arrayed wavelength grating.

9. The optical network of claim 6, wherein the RN further comprises a stage of power splitters optically coupled to the demultiplexer.

10. A method comprising:
   instructing a first carrier office (CO) to transmit a first optical signal along a first feeder fiber to a remote node (RN), wherein the first CO comprises:
      a first optical line terminal (OLT) configured to transmit the first optical signal; and
      a first transmit-erbium-doped fiber amplifier (EDFA) optically coupled to the first OLT and the first feeder fiber, the first transmit-EDFA operable between a respective enabled state and a respective disabled state, the enabled state of the first transmit-EDFA configured to allow the first optical signal transmitted from the first OLT to pass through the first transmit-EDFA to the RN, the disabled state of the first transmit-EDFA configured to substantially inhibit the passing of the first optical signal from the first OLT through the first transmit-EDFA to the RN;
   determining whether the RN receives the first optical signal; and
   when the RN fails to receive the first optical signal, instructing a second CO to transmit a second optical signal to the RN along a second feeder fiber,
   wherein the second CO comprises:
      a second OLT configured to transmit the second optical signal; and
      a second transmit-EDFA optically coupled to the second OLT and the second feeder fiber, the second transmit-EDFA operable between a respective enabled state and a respective disabled state, the enabled state of the second transmit-EDFA configured to allow the second optical signal transmitted from the second OLT to pass through the second transmit-EDFA to the RN, the disabled state of the second transmit-EDFA configured to substantially inhibit the passing of the second optical signal from the second OLT through the second transmit-EDFA to the RN,
   wherein the remote node comprises:
      a first node input optically coupled to the first feeder fiber;
      a second node input optically coupled to the second feeder fiber;
      a two-by-two optical switch comprising:
         a first switch input optically coupled to the first node input;
         a second switch input optically coupled to the second node input;
         a first switch output switchably coupled to the first switch input or the second switch input; and
         a second switch output switchably coupled to the first switch input or the second switch input;
      a photodiode optically coupled to the second switch output; and
      a capacitor electrically coupled to the photodiode and the two-by-two optical switch,
   wherein when the first switch input is switchably coupled to the first switch output, the second switch input is switchably coupled to the second switch output, and when the second optical signal is received by the second switch input and passes out the second switch output to the photodiode, the photodiode charges the capacitor, and when the capacitor is charged to a threshold charge, the capacitor triggers the two-by-two optical switch to have the first switch input switchably coupled to the second switch output and the second switch input switchably coupled to the first switch output, and
   wherein when the second switch input is switchably coupled to the first switch output, the first switch input is switchably coupled to the second switch output, and when the first optical signal is received by the first switch input and passes out the second switch output to the photodiode, the photodiode charges the capacitor, and when the capacitor is charged to the threshold charge, the capacitor triggers the two-by-two optical switch to have the first switch input switchably coupled to the first switch output and the second switch input switchably coupled to the second switch output.

11. The method of claim 10, wherein the RN further comprises a demultiplexer optically coupled to the first switch output.

12. The method of claim 11, further comprising, demultiplexing, by a demultiplexer optically coupled to the first switch output, the optical signal outputted from the first switch output into demultiplexed optical signals.

13. The method of claim 12, further comprising splitting, by a stage of power splitters optically coupled to the demultiplexer, each demultiplexed optical signal into multiple split-demultiplexed optical signals.

14. The method of claim 10, further comprising:
   receiving a remote node status indicating whether the RN is receiving the first optical signal from the first CO; and
   when the remote node status indicates that the RN is not receiving the first optical signal from the first CO, instructing the second transmit-EDFA to be in the enabled state.

15. The method of claim 14, further comprising, when the remote node status indicates that the RN is receiving the first optical signal from the first CO, instructing the second transmit-EDFA to be in the disabled state.

16. The method of claim 10, wherein the first optical signal and the second optical signal are the same.

* * * * *